(12) United States Patent
Mitsui et al.

(10) Patent No.: US 9,604,759 B2
(45) Date of Patent: Mar. 28, 2017

(54) POUCH CONTAINER

(71) Applicants: FUJI SEAL INTERNATIONAL, INC., Osaka-shi, Osaka (JP); NIPRO CORPORATION, Osaka-shi, Osaka (JP)

(72) Inventors: Hitoshi Mitsui, Otsu (JP); Kenji Kawasaki, Tokyo (JP); Osao Ueda, Neyagawa (JP); Toshio Ishiki, Yao (JP); Tadashi Takano, Yao (JP); Jumpei Sako, Tokyo (JP); Manabu Ishihara, Mobara (JP); Yuta Sato, Osaka (JP); Hiroyuki Nakagami, Osaka (JP); Masayuki Uenishi, Osaka (JP)

(73) Assignees: FUJI SEAL INTERNATIONAL, INC., Osaka (JP); NIPRO CORPORATION, Osaka (JP)

( * ) Notice: Subject to any disclaimer, the term of this patent is extended or adjusted under 35 U.S.C. 154(b) by 0 days.

(21) Appl. No.: 14/411,253

(22) PCT Filed: Jun. 7, 2013

(86) PCT No.: PCT/JP2013/065793
§ 371 (c)(1),
(2) Date: Dec. 24, 2014

(87) PCT Pub. No.: WO2014/002730
PCT Pub. Date: Jan. 3, 2014

(65) Prior Publication Data
US 2015/0183555 A1 Jul. 2, 2015

(30) Foreign Application Priority Data

Jun. 26, 2012 (JP) .................................. 2012-143372
Sep. 13, 2012 (JP) .................................. 2012-201214
(Continued)

(51) Int. Cl.
B65D 33/00 (2006.01)
B65D 33/08 (2006.01)
(Continued)

(52) U.S. Cl.
CPC ................ *B65D 33/08* (2013.01); *A61J 1/10* (2013.01); *B32B 27/08* (2013.01); *B32B 27/281* (2013.01);
(Continued)

(58) Field of Classification Search
CPC .. B65D 33/007; B65D 33/2541; B65D 33/10; B65D 33/08
(Continued)

(56) References Cited

U.S. PATENT DOCUMENTS 3,307,549 A * 3/1967 Zackheim ........... A61M 3/0245
128/DIG. 24
3,473,532 A * 10/1969 Eisenberg ................. A61F 5/44
251/342

(Continued)

FOREIGN PATENT DOCUMENTS

| CA | 2777136 A1 | 5/2011 |
|---|---|---|
| JP | H09-313518 A | 12/1997 |

(Continued)

OTHER PUBLICATIONS

Jul. 2, 2013 International Search Report issued in International Application No. PCT/JP2013/065793.
(Continued)

*Primary Examiner* — Jes F Pascua
(74) *Attorney, Agent, or Firm* — Oliff PLC

(57) ABSTRACT

A pouch container is provided with sack-like portions provided respectively to upper parts of the front-surface sheet and the rear-surface sheet.

26 Claims, 33 Drawing Sheets

(30) Foreign Application Priority Data

Feb. 18, 2013 (JP) .................................. 2013-029520
May 15, 2013 (JP) .................................. 2013-102972

(51) Int. Cl.

| | |
|---|---|
| *A61J 1/10* | (2006.01) |
| *B65D 75/58* | (2006.01) |
| *B65D 33/14* | (2006.01) |
| *B32B 27/08* | (2006.01) |
| *B32B 27/28* | (2006.01) |
| *B32B 27/30* | (2006.01) |
| *B32B 27/34* | (2006.01) |
| *B32B 27/36* | (2006.01) |
| *B65D 75/56* | (2006.01) |
| *A61J 1/14* | (2006.01) |
| *B65D 33/25* | (2006.01) |

(52) U.S. Cl.
CPC .......... *B32B 27/304* (2013.01); *B32B 27/308* (2013.01); *B32B 27/34* (2013.01); *B32B 27/36* (2013.01); *B32B 27/365* (2013.01); *B65D 33/007* (2013.01); *B65D 33/14* (2013.01); *B65D 33/2533* (2013.01); *B65D 75/566* (2013.01); *B65D 75/5805* (2013.01); *B65D 75/5883* (2013.01); *A61J 1/1493* (2013.01); *B32B 2307/518* (2013.01); *B32B 2307/558* (2013.01); *B32B 2307/7242* (2013.01); *B32B 2439/80* (2013.01); *B65D 33/2508* (2013.01); *B65D 2203/04* (2013.01)

(58) Field of Classification Search
USPC ............................ 383/35, 65, 10, 9, 905, 906
See application file for complete search history.

(56) References Cited

U.S. PATENT DOCUMENTS

| | | | | |
|---|---|---|---|---|
| 3,491,973 | A * | 1/1970 | Hartbauer | B62B 1/26 232/43.2 |
| 3,724,461 | A * | 4/1973 | Eisenberg | A61F 5/4405 128/DIG. 24 |
| 3,865,165 | A * | 2/1975 | Glass | A61G 7/0503 383/10 |
| 4,204,526 | A * | 5/1980 | Samuels | A61F 2/0095 383/35 |
| 4,305,161 | A | 12/1981 | Diaz | |
| 4,838,874 | A | 6/1989 | Eisenberg | |
| 5,026,173 | A * | 6/1991 | Jensen | B65D 33/06 383/10 |
| 6,324,704 | B1 * | 12/2001 | Imo | A47K 11/12 4/144.2 |
| 6,922,852 | B1 | 8/2005 | Blum | |
| 2007/0183692 | A1 * | 8/2007 | Pawloski | B65D 33/2508 383/61.2 |
| 2008/0124006 | A1 | 5/2008 | Yamaguchi et al. | |
| 2011/0280505 | A1 | 11/2011 | Taheri | |
| 2011/0293202 | A1 | 12/2011 | Takeda et al. | |
| 2013/0066292 | A1 | 3/2013 | Ueda | |

FOREIGN PATENT DOCUMENTS

| | | | | |
|---|---|---|---|---|
| JP | WO 2007010857 A1 * | 1/2007 | ............ | A45B 25/24 |
| JP | 2007-253977 A | 10/2007 | | |
| JP | 2009005720 A * | 1/2009 | | |
| JP | 2009125162 A | 6/2009 | | |
| JP | 2011078737 A | 4/2011 | | |
| JP | 4748064 B2 | 8/2011 | | |
| JP | 2012010741 A * | 1/2012 | | |
| SG | 186350 A1 | 1/2013 | | |
| WO | 2010026964 A2 | 3/2010 | | |
| WO | 2011054170 A1 | 5/2011 | | |
| WO | 2011145395 A1 | 11/2011 | | |
| WO | 2012002003 A1 | 1/2012 | | |
| WO | 2012066865 A1 | 5/2012 | | |

OTHER PUBLICATIONS

Jan. 7, 2016 Extended European Search Report issued in European Patent Application No. 13810492.2.

* cited by examiner

POUCH CONTAINER

TECHNICAL FIELD

The present invention relates to a pouch container.

BACKGROUND ART

Because pouch containers have excellent sealing performance and handling ability, they are widely used as containers for not only foods and toiletry products, but also enteral nutrient, intravenous feeding solution, infusion solution, etc. Medical pouch containers used for administering a nutrient to a patient have an opening through which the nutrient or its diluted solution is poured.

Meanwhile, when a nutrient or the like is poured into the pouch through the above-described opening, there is no choice but to carry out the unstable operation of opening the opening of the container while holding the container around the opening by one hand, and therefore, there is demand for improvement in such operability. In consideration of such a situation, there is proposed a medical pouch container having a pair of open and close operating portions which constitute penetration passages into which the fingers are inserted, between a wall surface sheet and soft plastic sheets fixed on the outer surface of the wall surface sheet (see Patent Document 1).

As a technique related to the present invention, Patent Document 1 discloses a medical pouch container in which an opening into which a tube can be bent and inserted is formed in a seal region.

CITATION LIST

Patent Documents

Patent Document 1: JP 2011-078737 A
Patent Document 2: JP 2000-125162 A

SUMMARY OF THE INVENTION

Technical Problem

According to the pouch container disclosed in the above-described Patent Document 1, the above-described operability can be improved to some extent by holding the container by the fingers inserted into the penetration passages. However, in the case of this pouch container, there remains room for improvement because, as shown in the figures of the same document, the fingertips protrude from the penetration passages when the container is held, and there is a risk that, for example, filled contents such as a nutrient may fall on the fingers.

Solution to Problem

A pouch container according to the present invention has a wall surface sheets constituting at least a front surface portion and a back surface portion, a filling portion being surrounded by the sheets, and an opening formed between the front surface portion and the back surface portion on one end side in the container longitudinal direction, the opening being connected to the filling portion, bag-shaped portions being provided in the front surface portion and the back surface portion, respectively, on the one end side in the container longitudinal direction, and this container is characterized in that the bag-shaped portions have internal spaces which are separated from the filling portion and insertion openings which enables the fingers to be inserted into the spaces from the lateral direction of the container.

With the above-described structure, it is possible to insert the fingers into the internal spaces of the bag-shaped portions from the container lateral direction. The fingers inserted into the bag-shaped portions (for example, the thumb and the index finger) are placed along the container lateral direction, and by opening the space between the thumb and the index finger in this state, the opening can be opened easily. Because the thumb and the index finger are fully inserted into the bag-shaped portions, excellent retention of the container can be realized, and the container can be held stably, as the fingers do not easily slip out even if the weight of the filled content is heavy. In addition, because the thumb and the index finger are covered by the bag-shaped portions to their fingertips, it is possible to prevent the filled content from spilling over the fingers. Because the opening state can be maintained simply by opening the space between the thumb and the index finger, it is possible, for example, to prevent such a trouble that the filled content spills out, which could otherwise be caused when the opening is closed during the pouring operation.

Preferably, in the pouch container according to the present invention, a zipper for closing the opening is provided on the wall surface sheets, and the bag-shaped portions are formed in flap-shaped portions which extend from the zipper to the one end side in the container longitudinal direction. With this structure, because the hand holding the container tends not to cover the filling portion, the amount of the filled content can be easily confirmed.

In the structure where the bag-shaped portions are provided above the zipper, preferably, the insertion openings are provided on the one end side of the bag-shaped portions in the container lateral direction, and a seal portion is provided between the flap-shaped portions, for joining the other end portions in the container lateral direction. Preferably, the pair of flap-shaped portions are integrated on the other end side in the container lateral direction to form a closed portion, but are not joined on the one end side to form an opened portion. With this structure, the opening can be opened more easily. If the other end portions of the pair of flap-shaped portions are not joined to each other in the container lateral direction, the bag-shaped portions tend to be folded to the outside at their bases, for example, when the space between the thumb and the index finger is widened, but, by providing the seal portion (closed portion), the bag-shaped portions can be prevented from being folded, and the force is allowed to easily act in the direction along which the opening is opened. Further, by opening the pair of the flap-shaped portions widely in the opened portion, the pair of the flap-shaped portions are opened by a sufficient width, and a gutter-shaped guide path is formed in the closed portion. For example, by tilting the opening such that the closed portion is positioned slightly below the opened portion, it becomes possible to use the gutter-shaped guide path formed by the closed portion more effectively.

In the structure in which the seal portion is provided, the seal portion is formed so as to be inclined in the container longitudinal direction and the container lateral direction so that the aperture of the flap-shaped portions gradually becomes smaller toward the zipper. With this structure, the gutter-shaped guide path is formed by the closed portion so as to have a funnel shape in which the width gradually becomes narrower from the opening side of the guide opening portion to the zipper. Therefore, even without tilting the opening greatly, the guiding effect is exerted more effectively by the funnel-shaped guiding path, and it becomes possible to pour the liquid more easily.

Preferably, the pouch container according to the present invention has tongue pieces for closing the insertion openings provided in the bag-shaped portions, and the insertion openings are opened by folding the tongue pieces into the internal spaces. With this structure, the fingers can be easily inserted into the bag-shaped portions. The tongue pieces folded into the internal spaces cause, for example, the edges of the insertion openings to rise, and enhance ease of insertion of the finger.

Preferably, the pouch container according to the present invention has an outlet portion provided on the other end side in the container longitudinal direction, a flexible long tube being attached to the outlet portion, and an edge seal portion formed by joining edges of the front surface portion and the back surface portion to each other, and, in this container, a tube-holding portion is formed in the edge seal portion, for holding the tube, and the tube-holding portion is formed by cutting in or cutting out the wall surface sheet from an outer end of the edge seal portion by a length equal to or greater than the diameter of the tube. With this structure, because the tube-holding portion holds the tube, it is possible to prevent such troubles that the tube coils around something, the tube is caught in something, or the tube falls off during movement. Because this tube-holding portion is formed by cutting in or cutting out the wall surface sheet from the outer end of the widened seal portion, the operations of holding and removing the tube are easy, and smooth handling of the tube becomes possible even when the operation is performed by one hand. For example, by pressing the tube against the outer end of the edge seal portion in which the tube-holding portion is formed, the tube can be easily inserted into the holding portion. When the tube is removed from the holding portion, the tube can be easily removed by pulling the tube to the outside.

Preferably, in the structure in which the tube-holding portion is provided, the tube-holding portion has an introduction path which has a width smaller than the diameter of the tube, and a housing hole which is connected to the introduction path and which is equal in size to or larger than the tube. With this structure, the retention of the tube is improved, and, for example, the tube can be more reliably prevented from slipping off from the tube-holding portion.

Preferably, in the structure in which the tube-holding portion is provided, the tube-holding portion has a tongue piece which covers at least a portion of the housing hole and contacts the tube when the tube is inserted into the housing hole. With this structure, because the tongue piece presses the tube, retention of the tube is further improved.

Preferably, in the structure in which the tube-holding portion is provided, the edge seal portion has widened seal portions which are formed by widening the width locally, and a suspension hole and the tube-holding portion are formed in the widened seal portion. With this structure, it is possible to provide only one widened seal portion and to design the container capacity to be large. Further, because when the tube-holding operation is carried out while the container is hung from the hanger or the like by hooking the suspension hole, the distance from the supporting point to the tube-holding portion becomes short, oscillation is hard to be produced, and the operation can be performed stably, resulting in further improvement of operability.

Preferably, in the pouch container according to the present invention, the insertion openings are provided on the side of the one end portions of the bag-shaped portions in the width direction, and a finger-hooking seal portion in which the inner surfaces of the bag-shaped portion are joined to each other is provided in an upper portion of the bag-shaped portion on the other end side of the insertion openings in the width direction. With this structure, because the tip of the thumb can be caught in the finger-hooking seal portion, the thumb is better caught in the bag-shaped portion, and the force acts more easily in the direction to open the opening. This structure is particularly advantageous for use, for example, by women with smaller hands.

Preferably, in the structure in which the seal portion is provided, the bag-shaped portions have fold-forming portions for forming bent portions along the container longitudinal direction. In particular, it is preferable to provide the fold-forming portions on the side of the other end portions along the width direction, where the fingers inserted into the bag-shaped portions cannot reach. With this structure, it becomes easier to open the opening. Because the pouch container is highly flexible, the portions of the bag-shaped portions into which the fingers are inserted assume shapes that conform to the fingers. Meanwhile, although the portions located further inside than the fingertips become curved from the positions of the fingers to the other end portions in the container lateral direction, or are bent at the positions of the fingertips, the bag-shaped portions are bent preferentially at the fold-forming portions when the opening is opened by, for example, providing the fold-forming portions, and the bent portions (for example, bent lines) extending in the container longitudinal direction are formed. In doing so, for example, the portions located further inside than the fingertips extend straight along the fingers to the bent lines (fold-forming portions), thereby enabling easier opening of the opening.

Advantageous Effects of Invention

With the present invention, it is possible to provide a pouch container which can prevent the problems of, for example, falling of the filled content onto the finger, and which can be easily held in a stable manner while the opening is opened. The pouch container according to the present invention can be manufactured in a simple and inexpensive manner; for example, by the existing bag manufacturing process using a continuous sheet.

DESCRIPTION OF EMBODIMENTS

Examples of the embodiments of the present invention will be described below in detail with reference to the drawings.

Hereinafter, a liquid nutrient (not shown) will be used as an example of filled content which is to be poured into a pouch container. However, the filled content is not limited to this, and it may be water and the like used to dilute the nutrient, or may be a jelly or a paste material. Although the pouch container according to the present invention contains a liquid, such as a nutrition solution and infusion solution, and is preferably used as a medical bag, such as a nutrient supply bag or an infusion solution bag, the structure of the present invention is not limited to medical use, and may be applied to a variety of types of containers, including, for example, those used for foods.

Although a flat pouch which is composed of only a front surface sheet 11 and a back surface sheet 12, except for its bag-shaped portions (bag-shaped portions for fingers), will be used as an example below, the structure of the present invention may be applied to other forms of pouches, including, for example, a standing pouch and a side gazette pouch. If a tube-holding portion according to the present invention is formed in a seal portion of a gazette portion of these pouch containers having the gazette, the gazette portion is included in the front surface portion or the back surface portion. More specifically, an edge seal portion which is formed by joining edges of the front surface portion and the back surface portion to each other also includes an edge seal portion which is formed by, for example, joining edges of the front surface portion and the gazette portion (part of the back surface portion) to each other.

Hereinafter, for the sake of convenience, the "container longitudinal direction" will be referred to as the "container vertical direction," the "one longitudinal end side" will be referred to as "up," the "another container longitudinal end side" on which an outlet portion 17 is provided will be referred to as "down." In addition, the direction in which sheets are laminated will be referred to as the "container front and back direction," and the direction which is orthogonal to the container vertical direction and the container front and back direction (container width direction) will be referred to as the "container lateral direction" or the "container width direction." Hereinafter, these expressions may be simply referred to as the vertical direction, the front and back direction, and the lateral direction or the width direction. Insertion openings 24A and 24B are assumed to be formed on one end side in the lateral direction.

<First Embodiment>

Figure 1:
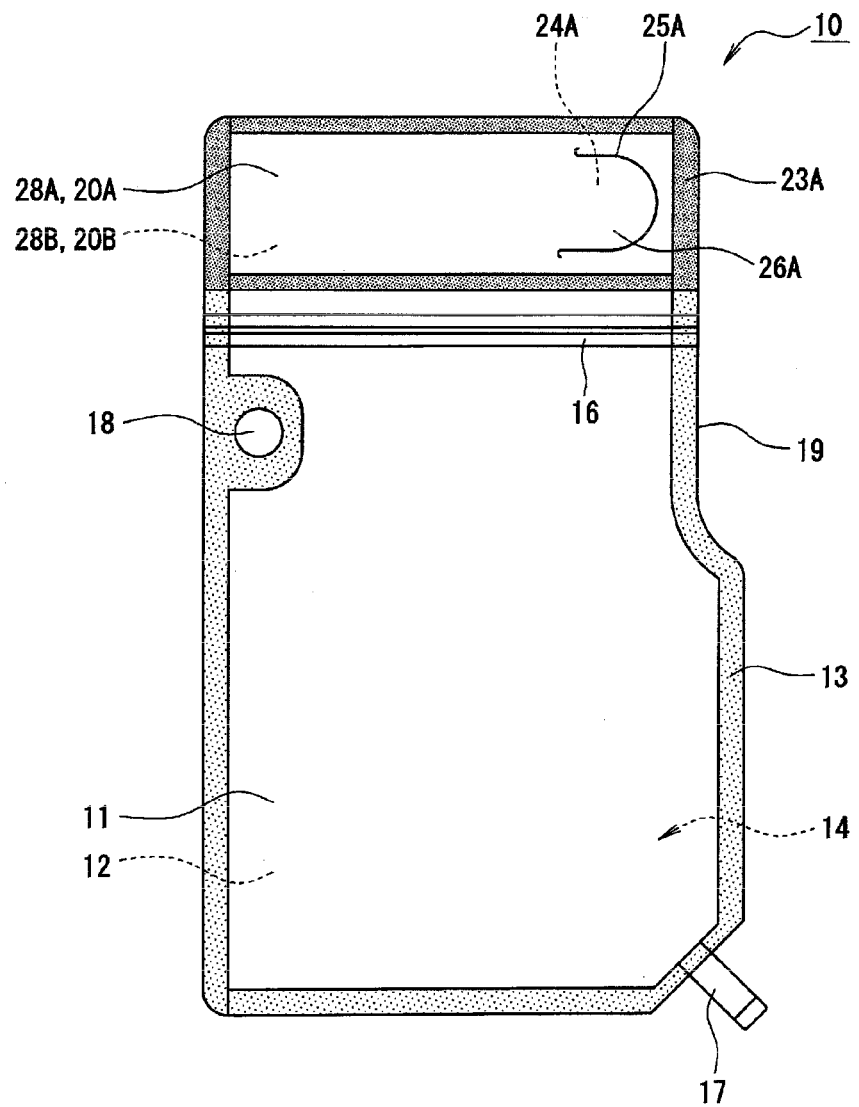
FIG. 1 shows a front view of a pouch container according to a first embodiment of the present invention.
Figure 2:
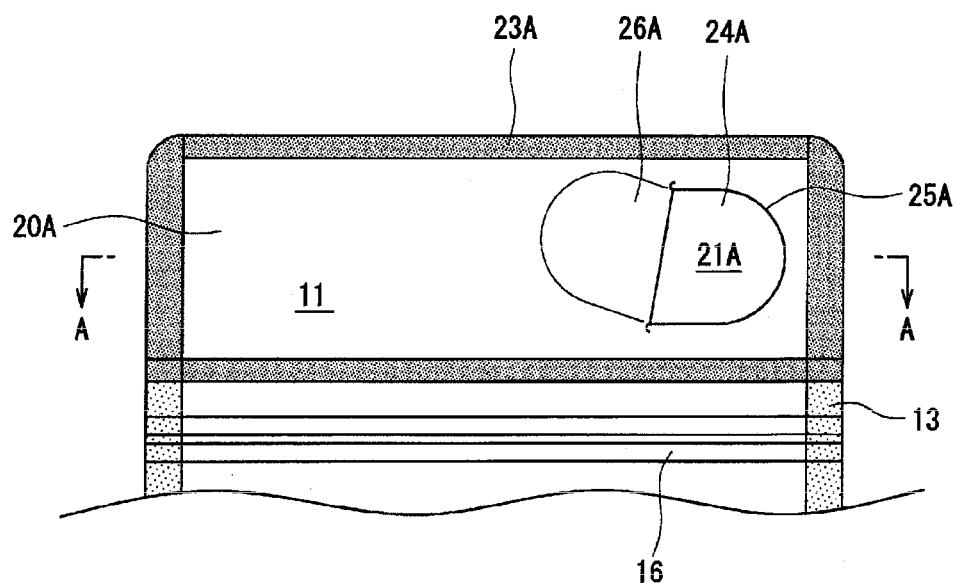
FIG. 2 shows a front view (enlarged view of a bag-shaped portion) of the pouch container according to the first embodiment of the present invention, in which a tongue piece is folded into the bag-shaped portion.
Figure 3:
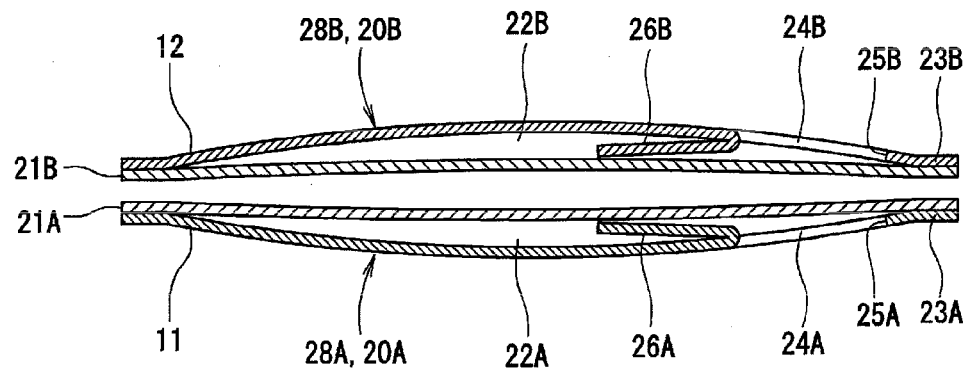
FIG. 3 shows a schematic view of a cross section taken along line A-A in FIG. 2.

A pouch container 10 according to the first embodiment will be described in detail with reference to FIGS. 1 to 7. First, referring to FIGS. 1 to 3, FIGS. 1 and 2 show front views of the pouch container 10, and FIG. 2 shows tongue pieces 26A and 26B folded into the inside of bag-shaped portions 20A and 20B (internal spaces 22A and 22B). FIG. 3 shows a cross section obtained when the bag-shaped portions 20A and 20B are cut along line A-A in FIG. 2 in the front and back direction, which is parallel to the width direction.

The pouch container 10 has the front surface sheet 11 and the back surface sheet 12 which overlap each other. The front surface sheet 11 and the back surface sheet 12 are a pair of wall surface sheets respectively constituting a front surface portion and a back surface portion of the container. The pouch 10 has an edge seal portion 13 formed by joining the edges of the sheets to each other, except for the upper edges of the sheets. More specifically, the edge seal portion 13 is formed on both widthwise edges (side edges) of the front and back surface sheets, and an opening 15 connected to a filling portion 14 is formed in the upper portion of the container (see the below-described FIG. 7). The opening 15 is an opening directed upward and is formed between the front surface sheet 11 and the back surface sheet 12 where these sheets are not joined.

The pouch container 10 has a zipper 16 (zipper sealing portion) for closing the opening 15. The edge seal portion 13 and the zipper 16 seal the container internal space surrounded by the wall surface sheets. This sealed container internal space is a filling portion 14 (containing area) in which a nutrient is to be filled. The zipper 16 is configured by arranging a first sheet with a protruding line portion and a second sheet with a recessed line portion which fits in the protruding line portion so as to face each other. For example, the first sheet is joined to the inner surface of the front surface sheet 11, and the second sheet is joined to the inner surface of the back surface sheet 12.

The engaging force of the zipper 16 can be adjusted by its shape, size, etc. If the engaging force of the zipper 16 is too strong, there is a risk that the zipper 16 cannot be opened only by the opening action force by the fingers inserted into the below-described bag-shaped portions 20A and 20B. If the engaging force of the zipper 16 is too weak, there is a risk that, when the zipper 16 is closed after a liquid is poured into the filling portion 14, the effect of sealing the filling portion 14 cannot be demonstrated sufficiently. Therefore, the engaging force of the zipper 16 can be adjusted according to the user of the pouch container 10 or a position of the pair of bag portions 20A and 20B. If the engaging force of the zipper 16 is strong, the zipper 16 may be opened in advance before the hand is inserted into the bag-shaped portions 20A and 20B.

The pouch container 10 has an outlet portion 17 (port portion) for pouring out the nutrient filled in the filling portion 14. The outlet portion 17 is, for example, a plastic tube with a stopper and is attached to a corner portion which is cut diagonally between the lower edge and the side edge of the wall surface sheet. The outlet portion 17 is provided on the corner portion facing a below-described suspension hole 18 in the diagonal direction. More specifically, the outlet portion 17 is attached by joining the components while sandwiching the outlet portion 17 between the front surface sheet 11 and the back surface sheet 12.

The outlet portion 17 is connected to a long tube 103 (see the below-described FIG. 24 and elsewhere), for example, at its exterior opening opposite to the interior opening communicating with the filling portion 14. Because a conventional tube can be used as the tube 103, detailed explanation of the tube 103 will be omitted. The tube 103 is a flexible tube and may have a chamber (infusion tube), a drip clamp (flow controller), a connector, etc. (none of them shown), if necessary. It is inserted from, for example, the nasal cavity and reaches the inside of the patient body, such as the stomach or the duodenum (not shown). Then, the liquid contained in the filling portion 14 is administered into the body of the patent through the tube 103.

In the pouch container 10, there is formed the suspension hole 18 on the extension line in the longitudinal direction of the outlet portion 17. The suspension hole 18 is formed by forming a part of the edge seal portion 13 to have a wide width and punching the wide seal portion in the front and back direction. When the nutrient filled in the pouch container 10 is administered to the patient, the longitudinal direction of the outlet portion 17 is directed along the vertical direction by hooking the suspension hole 18 on a hook or the like, and the nutrient can be poured out easily.

In the pouch container 10, a cut portion 19 is formed on the side opposite to the widthwise end portion in which the suspension hole 18 is formed, and the width of the upper portion of the container is narrower than the lower portion of the container. By narrowing the width of the upper portion of the container, in particular, by cutting and shortening the width on the insertion opening 24A and 24B side, it is possible to improve the retention, etc. of the container. In the present embodiment, the portion positioned vertically below the middle portion of the filling portion 14 is a widened portion which is made wider on the below-described insertion opening 24A and 24B side in the width direction than is the upper portion. This causes the center of gravity in the width direction to be deviated to the insertion opening 24A and 24B side, and when the pouch container 10 is hung from a stand by inserting a hanger hook through the suspension hole 18, the pouch container 10 as shown in FIG. 1 rests at a tilt in a clockwise manner around the suspension hole 18. As a result, the outlet portion 17 is positioned to extend in the vertical direction. Further, because, in the filling portion 14, the peripheral portion of the outlet portion 17 has a narrow width, when the pouch container 10 is hung from the stand, the liquid contained in the filling portion 14 easily flows into the outlet portion 17, thereby reducing the amount of the liquid remaining in the outlet portion 17.

Further, the pouch container 10 has the bag-shaped portion 20A provided in the upper portion of the front surface portion and the bag-shaped portion 20B provided in the upper portion of the back surface portion. The bag-shaped portions 20A and 20B are portions that are used when the opening 15 is opened to pour the nutrient into the filling portion 14, and are formed of a pair of wall surface sheets and bag-shaped portion-forming sheets 21A and 21B (hereinafter simply referred to as "sheets 21A and 21B") inserted therebetween. More specifically, the sheet 21A and the front surface sheet 11 are joined to each other by an edge seal portion 23A, and the sheet 21B and the back surface sheet 12 are joined to each other by an edge seal portion 23B, thereby forming the bag-shaped portions 20A and 20B, respectively.

The bag-shaped portions 20A and 20B are formed in a pair of flap-shaped portions 28A and 28B. That is, the pair of flap-shaped portions 28A and 28B, which extend outward (upward) from the opening 15 by a predetermined region and overlap each other, are formed on the pair of wall surface sheets. More specifically, the pair of flap-shaped portions 28A and 28B are provided above the zipper 16, which is an overlap portion of the pair of wall surface sheets, and have a substantially rectangular shape in the present embodiment.

Although, in the present embodiment, the pair of flap-shaped portions 28A and 28B have the same shape, the pair of flap-shaped portions may not need to have the same shape. It is possible, for example, to provide, on the pair of flap-shaped portions, pinching pieces which protrude outward but do not overlap with each other, and pick these pinching pieces with the fingers, to thereby facilitate the operation of opening the pair of flap-shaped portions. In the present embodiment, it can be said that the entire flap-shaped portions 28A and 28B are the bag-shaped portions 20A and 20B, respectively.

Each sheet constituting the pouch container 10 is typically made of a resin film. The resin film constituting the sheet is required to have basic performance as a package, including, for example, impact resistance, wear and abrasion resistance, and heat resistance. In addition, because each of the above-described seal portions is typically formed by heat sealing, the sheet is also required to have heat sealing property. The sheet is preferably a multiplayer sheet having a base film layer and a sealant layer which provides heat sealing property. If the sheet is required to have high gas barrier property and light shielding property, it is preferable to provide a barrier layer between the base film layer and the sealant layer. The base film itself may have a barrier property. In this case, the barrier layer is used as the base film, and the multilayer sheet has the barrier layer and the sealant layer. Further, if heat sealing property is provided on both sides of the sheet, the below-described single layer film which forms a sealant layer may be used. In the case of the multilayer sheet, a sheet may have two layers of the same type or different types of sealant layers (here, one of the sealant layers is used in the form of the base film), or a sheet having sealant layers on both sides of the base film layer may also be used. In the present embodiment, there is used a laminated sheet having double-sided heat sealing property; more specifically, a laminated sheet on which two different types of sealant layers are laminated.

Here, component materials of the base film layer, the sealant layer, and the gas barrier layer will be exemplified. Lamination of these layers can be carried out by a commonly-used lamination method, including, for example, dry lamination using an adhesive and heat lamination by sandwiching a heat adhesive layer between the layers and adhering them by heat.

As an example of a film constituting the base film layer, there is a one or more layered, stretched, or unstretched film composed of any of, for example, polyester (polyethylene terephthalate (PET), polyethylene naphthalate (PEN), polybutylene terephthalate (PBT), polycarbonate (PC), etc.), polyolefin (polyethylene (PE), polypropylene (PP), etc.), polyamide (nylon 6, nylon 66, etc.), polyacrylonitrile (PAN), polyimide (PI), polyvinyl chloride (PVC), polyvinylidene chloride (PVDC), polymethyl methacrylate (PMMA), and polyethersulfone (PES).

As an example of a film constituting the sealant layer, there is a one or more layered, stretched, or unstretched film composed of any of, for example, low density polyethylene (LDPE), linear low density polyethylene (LLDPE), ethylene-propylene copolymer (EP), unstreched polypropylene (CPP), biaxially oriented nylon (ON), ethylene-olefin copolymer, ethylene-acrylic acid copolymer (EAA), ethylene-methacrylic acid copolymer (EMAA), and ethylene-vinyl acetate copolymer (EVA).

Examples of the gas barrier layer include a film made by depositing (or sputtering) aluminum or inorganic oxide such as aluminum oxide or silica, on a metal film made of aluminum, etc., a resin film made of vinylidene chloride (PVDC), ethylene-vinyl alcohol copolymer (EVOH), etc., or any composite resin film (which may be, for example, the base film layer).

The wall sheet preferably has a scale (not shown) for measuring, for example, the liquid volume of the nutrient. In addition to the scale, a printing layer on which a product name, ingredients, precautions for use, etc. are indicated may also be provided.

The structure of the bag-shaped portions 20A and 20B will be further described in detail below.

The pouch container 10 has the bag-shaped portions 20A and 20B (the flap-shaped portions 28A and 28B) above the zipper 16. The zipper 16 is provided along the width direction, and the bag-shaped portions 20A and 20B are provided substantially parallel to the zipper 16 (the width direction). The pouch container 10 is formed in the form of a flat pouch in which the portion below the zipper 16 is composed of two wall surface sheets, but the portion above the zipper 16 is composed of four sheets. As described above, the bag-shaped portion 20A is formed by joining the sheet 21A to the inner surface of the front surface sheet 11, and the bag-shaped portion 20B is formed by joining the sheet 21B to the inner surface of the back surface sheet 12.

The bag-shaped portions 20A and 20B overlap in the front and back direction, and are disposed to face each other with the opening 15 therebetween. In the present embodiment, the sheets 21A and 21B are not joined to each other, and the bag-shaped portions 20A and 20B are separated. The bag-shaped portions 20A and 20B have a substantially rectangular shape which is longer in the width direction than in the vertical direction, and are equal to each other in the shape and size. Hereinafter, the contents that are common to the bag-shaped portions 20A and 20B will be described using the bag-shaped portion 20A as an example.

The bag-shaped portion 20A is provided over the entire width of the wall surface sheet. That is, the widthwise length of the portion located above the zipper 16 is equal to the widthwise length of the sheet 21A. The widthwise length of the sheet 21A may be shorter, but the above structure is preferable in terms of productivity. This enables the pouch container 10 to be manufactured in a simple and inexpensive manner by the existing bag manufacturing process using a continuous sheet.

The bag-shaped portion 20A has the internal space 22A which is isolated from the filling portion 14. In addition, the bag-shaped portion 20A has the insertion opening 24A which enables insertion of the finger into the internal space 22A from the width direction. In the embodiment shown in FIG. 1, the insertion opening 24A is closed by the below-described tongue piece 26A.

The internal space 22A is an independent space which is not in communication to the filling portion 14, and, in the front view state (see FIG. 1), its circumference is closed by the edge seal portion 23A. The internal space 22A is sized so that it can accommodate at least one finger, such as the thumb (the internal space 22B accommodates, for example, the index finger). More specifically, the internal space 22A is preferably set to have a size that can accommodate the entire finger, from the tip to the base of the finger. Further, because the internal space 22A accommodates the finger along the width direction, it is elongated in the width direction. In the internal space 22A, the insertion opening 24A is the only opening communicating with outside, and the other portions are closed by the sheets and the edge seal portion 23A.

The insertion opening 24A is provided on the side of one widthwise end portion of the bag-shaped portion 20A on which the cut portion 19 is formed; that is, the side opposite to the other widthwise end portion on which the suspension hole 18 is formed. The insertion opening 24B is provided precisely on the back side of the insertion opening 24A. The insertion opening 24A is designed so that the finger is inserted from the side of the one widthwise end portion, and the finger inserted from the insertion opening 24A is received in the internal space 22A with the tip of the finger directed to the side of the other widthwise end portion.

The insertion opening 24A is provided by forming a slit line 25A on the outer surface of the front surface portion (the front surface sheet 11 constituting the bag-shaped portion 20A). From the viewpoint of retention of the container, etc., it is preferable to form the slit line 25A in close proximity to the one widthwise end portion.

The slit line 25A is substantially U-shaped in the front view, and both ends thereof (hereinafter, referred to as "cut ends") are formed to be directed to the side of the other widthwise end portion. More specifically, the substantially linear portions of the slit line 25A are formed along the width direction, and the arc portion of the slit line 25A is formed to protrude to the side of the one widthwise end portion. The bag-shaped portion 20A has the tongue piece 26A which is a portion surrounded by the slit line 25A and a virtual line connecting between the cut ends (hereinafter, referred to as a "base line" of the tongue portion 26A) (see FIG. 1), and the insertion opening 24A is opened by folding the tongue portion 26A at the base line (see FIG. 2). If the finger is inserted into the insertion opening 24A from the one widthwise end portion, it is inserted through a gap between the edge portion on the side of the other widthwise end portion (that is, the base line portion) and the sheet 21A.

In order to enhance the retention of the container while facilitating insertion of the finger, in the slit line 25A the linear portion on the lower side is longer than the linear portion on the upper side. The lower end of the base line is located closer to the other widthwise end side than is the upper end, and the base line is inclined with respect to the vertical direction and the width direction. Thus, the size of the insertion opening 24A becomes larger on the lower side of the finger to which the weight of the container is not applied, while the size of the insertion opening 24A becomes smaller on the upper side of the finger to which the weight of the container is applied. Therefore, it is possible to reduce the load applied to the finger and facilitate insertion of the finger.

The tongue piece 26A is preferably folded into the inside (the inside of the internal space 22A) (see FIGS. 2 and 3). As the tongue piece 26A is connected to the edge portion of the insertion opening 24A on the side of the other widthwise end portion, by folding this tongue piece 26A into the inside, the edge portion rises easily. That is, in order to enhance ease of insertion of the finger, a gap for inserting the finger (gap between the edge portion and the sheet 21A) is widened using the tongue piece 26A. The tongue piece 26A may be folded into the inside upon use, or may be folded into the inside during production. Further, the tongue piece 26A may be joined to the front surface sheet 11 when it is folded into the inside.

Figure 4:
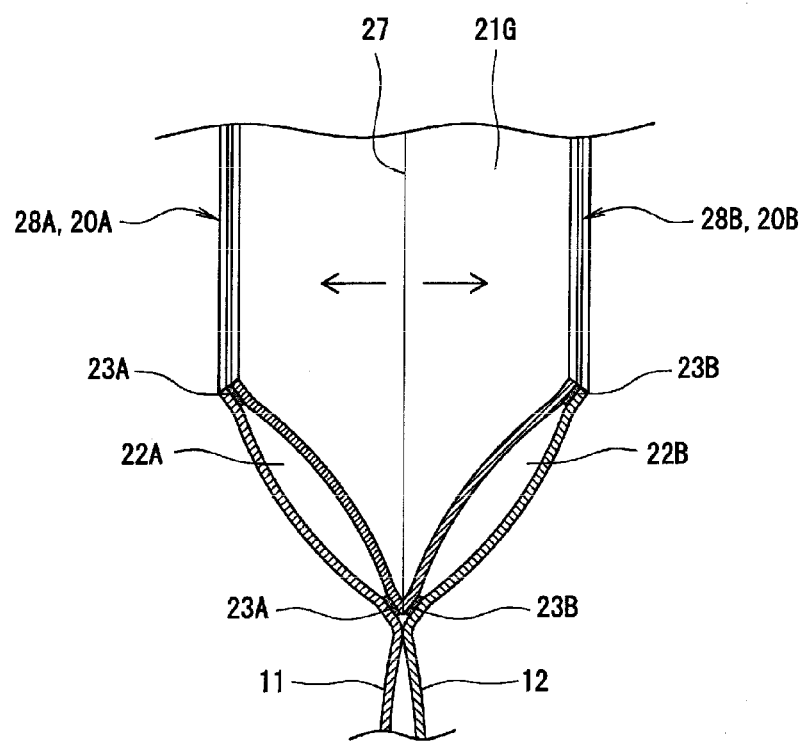
FIG. 4 shows a variant of the pouch container according to the first embodiment of the present invention.

FIG. 4 shows a variant of the first embodiment. FIG. 4 is a perspective view showing the bag-shaped portions 20A and 20B from a diagonally upward direction, and is a cross sectional view in which part of the bag-shaped portions 20A and 20B are cut vertically. In the embodiment shown in FIG. 4, the bag-shaped portions 20A and 20B are formed using a gazette sheet 21G instead of the sheets 21A and 21B. The gazette sheet 21G is a sheet having a V-shape in a sectional view, which is folded to project downward. The gazette sheet 21G is inserted between the pair of wall surface sheets so that a pleat line 27 becomes substantially parallel to the width direction. One of the sheet portions bisected by the pleat line 27 is joined to the inner surface of the front surface sheet 11, while the other one of the sheet portions is joined to the inner surface of the back surface sheet 12, thereby forming the two bag-shaped portions 20A and 20B.

Because, in the embodiment shown in FIG. 4, the bag-shaped portions 20A and 20B are formed of the pair of wall surface sheets and one gazette sheet 21G, the bag-shaped portions are connected to each other before use (before opening). Thus, it is possible to enhance sealing property of the filling portion before opening. There can be provided, for example, a cutting assist line, such as a half-slit line or a perforation line, on the pleat line 27 of the gazette sheet 21G, and by cutting the gazette sheet 21G along the cutting assist line upon use, the bag-shaped portions 20A and 20B can be separated from each other. By such separation, the same advantages as realized by the embodiment in which the sheets 21A and 21B are adopted can be obtained, and the opening 15 can be opened.

Next, an example of a manufacturing method of the pouch container 10 having the structure in FIG. 1 will be described with reference to FIG. 5. Of the manufacturing steps of the pouch container 10, FIG. 5 schematically shows the steps of laminating continuous bodies of the sheets and forming the seal portions.

Figure 5:
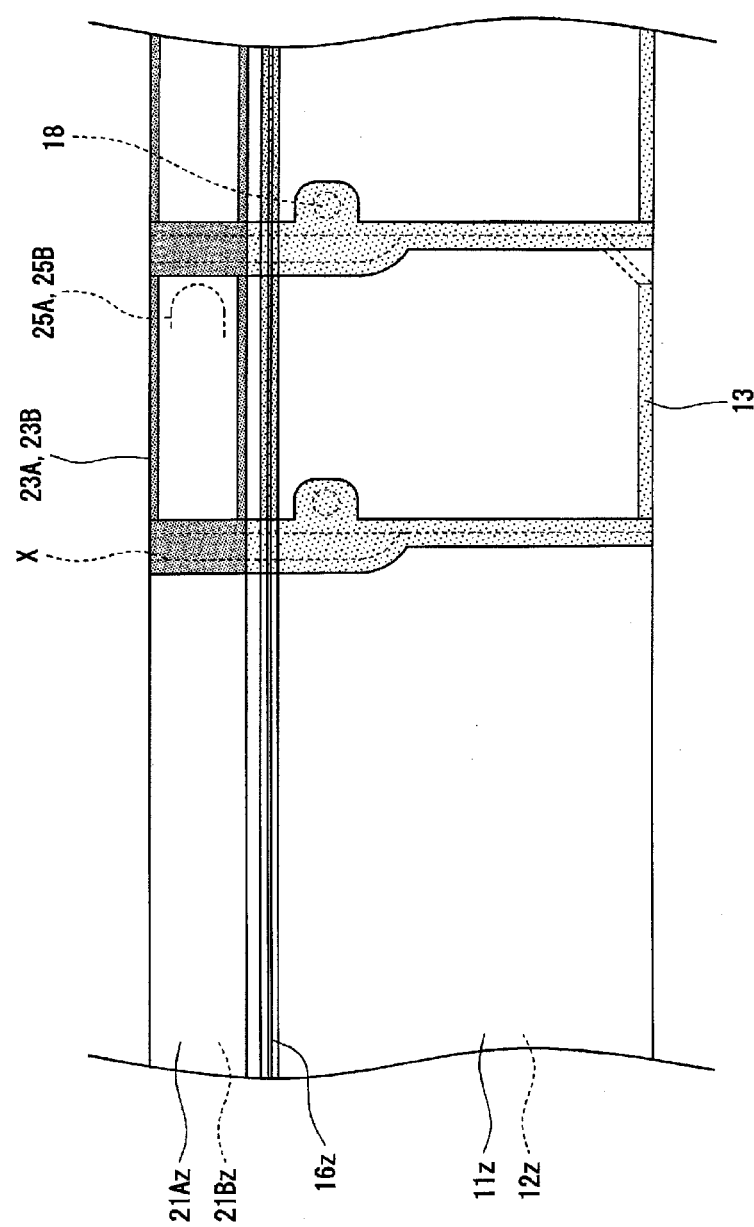
FIG. 5 shows a part of a manufacturing process of the pouch container according to the first embodiment of the present invention.

As shown in FIG. 5, first, the sheets constituting the front surface sheet 11, the back surface sheet 12, and the zipper 16 (for example, the first sheet with the protruding line portion and the second sheet with the recessed line portion), and continuous bodies of the sheets 21A and 21B (hereinafter, referred to as "continuous bodies 11z, 12z, 16z, 21Az, and 21Bz") are prepared and laminated to each other. The continuous bodies 16z are laminated in such a manner that the protruding line portion of the first sheet is fitted into the recessed line portion of the second sheet, and the continuous bodies 21Az and 21Bz are laminated in such a manner that they overlap each other.

In the steps of laminating the continuous bodies, the continuous bodies 16z, 21Az, and 21Bz are inserted between the continuous bodies 11z and 12z which overlap each other. At this time, the continuous bodies 11z and 12z are laminated so that their sealant layers can face each other, and the sealant layer of the continuous body 21Az is laminated so as to face the sealant layer of the continuous body 11z, while the sealant layer of the continuous body 21Bz is laminated so as to face the sealant layer of the continuous body 12z. In doing so, it is possible to form the above-described seal portions while preventing the continuous bodies 21Az and 21Bz from being joined to each other during the heat sealing step.

After the lamination step, the seal portions are formed on the above-described continuous bodies in the heat sealing step. In the heat sealing step, by heat sealing lower edges of the continuous bodies 11z and 12z and a predetermined portion along the transverse direction, apart from the portion to which the outlet portion 17 is attached, an edge seal portion 13 is formed. Here, the lower edges of the continuous bodies are portions that become a lower edge of the pouch container 10, and the predetermined portion is a portion that becomes a side edge of the pouch container 10. In the heat sealing step, the continuous bodies 16z, 21Az, and 21Bz are joined to the continuous bodies 11z and 12z. In doing so, the opening 15 is closed, and the edge seal portions 23A and 23B are formed. When the continuous bodies 21Az and 21Bz having double-sided heat sealing property are used, it is preferable to heat seal the continuous bodies 21Az and 21Bz with a metal plate or a non-melting resin sheet therebetween so that the continuous bodies 21Az and 21Bz are not joined to each other in the edge seal portion 23A and 23B.

Then, the above-described continuous bodies are cut along an intended slit line X using a die cut roll, etc., and are divided into individual container sizes. The above-described heat sealing and cutting may be performed simultaneously. At this time, or in the separate step, the suspension hole 18 and the slit lines 25A and 25B are formed. Thus, the bag-shaped portions 20A and 20B having the internal spaces 22A and 22B into which a finger can be inserted are formed. Finally, the outlet portion 17 is attached, thereby completing the pouch container 10.

Although, in the present manufacturing step there has been described the example in which the continuous bodies 21Az and 21Bz are used to manufacture the pouch container shown in FIG. 1, the long gazette sheet 21G may be used instead of the continuous bodies 21Az and 21Bz to manufacture the pouch container of the embodiment shown in FIG. 4. Further, in order to manufacture the pouch container shown in FIG. 1, the long gazette sheet 21G may be supplied to a bag-making machine, and before it is heat sealed to the wall surface sheet or after it is heat sealed to the wall surface, the gazette sheet 21G may be cut along the pleat line to thereby be divided into the continuous bodies 21Az and 21Bz or the bag-shaped portions 20A and 20B, or the upper portion of the wall surface sheet may be folded to the inside or the outside to form the bag-shaped portions 20A and 20B.

Figure 6:
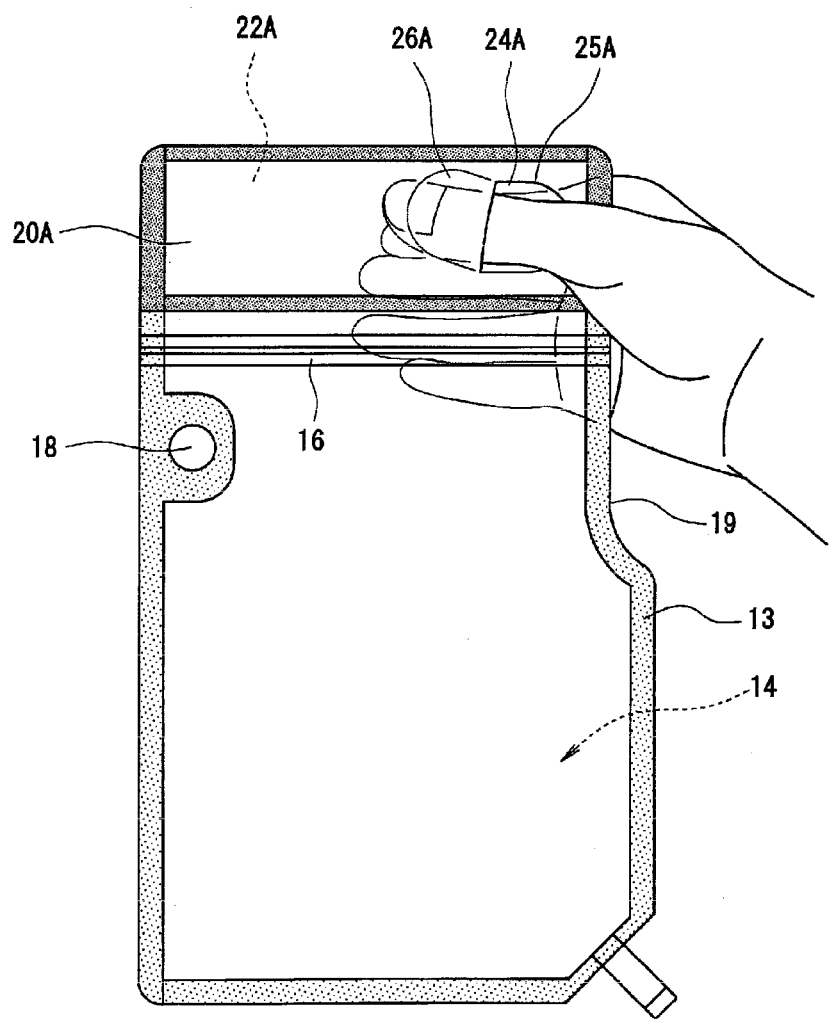
FIG. 6 shows a front view of the pouch container according to the first embodiment of the present invention, in which a filling opening is open.
Figure 7:
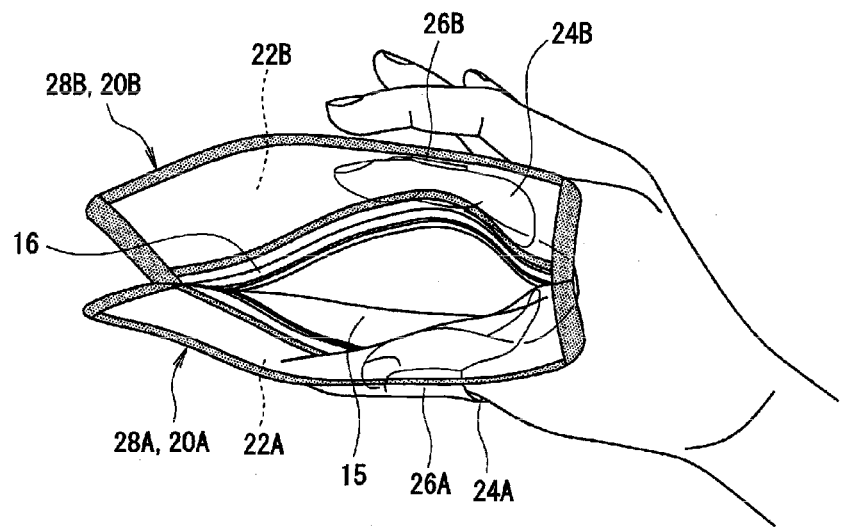
FIG. 7 shows a top view of the pouch container according to the first embodiment of the present invention, in which the filling opening is open.

Next, the effects of the pouch container 10 will be described in detail with reference to an example of the pouch container 10 in use in FIGS. 6 and 7.

When the nutrient is poured into the filling portion 14 from the opening 15 of the pouch container 10, the zipper 16 is opened to thereby open the opening 15 while the container is held by one hand (hereinafter, it is assumed to be the right hand). First, the thumb is inserted into the internal space 22A of the bag-shaped portion 20A, and the index finger is inserted into the internal space 22B of the bag-shaped portion 20B, to thereby hold the container. At this time, the thumb and the index finger are inserted from the side of the one widthwise end portion into the respective internal spaces through the insertion openings 24A and 24B. The insertion openings 24A and 24B are formed in close proximity to the one widthwise end portion, and are also formed by the substantially U-shaped slit lines 25A and 25B each having the lower portion that is longer than the upper portion. Further, the insertion openings 24A and 24B are opened, because the tongue pieces 26A and 26B are folded into the inside. Therefore, it is possible to insert the fingers smoothly from the insertion openings 24A and 24B.

Subsequently, by opening a space between the thumb and the index finger respectively inserted into the bag-shaped portions 20A and 20B, the zipper 16 is opened, and the opening 15 is opened. That is, the thumb is moved to the front side and the index finger is moved to the back side. By further broadening the space between the thumb and the index finger, the opening 15 can be opened widely.

Next, when the space is provided between the thumb and the index finger, and the opening 15 is opened widely, the nutrient starts to be poured. Because the open state is maintained simply by keeping the space between the thumb and the index finger, it is possible to bring the nutrient close to the base of the bag-shaped portions 20A and 20B to thereby pour the nutrient, and prevent the nutrient from spilling, which could otherwise be caused when the opening 15 is closed during the pouring operation. Further, although the weight of the container increases when the nutrient is poured therein, because the fingers that hold the container are fully inserted into the bag-shaped portions 20A and 20B and do not easily slip out, they can hold the container stably. Further, even if the nutrient flows outside the container by mistake, the thumb and the index finger are covered by the bag-shaped portions to their fingertips, and therefore, it is possible to prevent the nutrient from spilling over the fingers.

By placing the zipper 16 in a closed state after the liquid, such as the nutrient, is poured into the filling portion 14, the filling portion 14 can be brought into a sealed state. In doing so, it is possible to prevent the liquid from leaking from the upper portion of the pouch container 10 and reduce a risk of contamination of the liquid by bacteria, etc.

As described above, with the pouch container 10, it is possible to carry out the operation of pouring the nutrient easily while holding the container by one hand, and improve the operability of the pouring operation to a large extent. That is, it is possible to hold the pouch container 10 by one hand, while opening the opening 15 by the fingers of this hand, and maintain the open state of the pouch container 10 by keeping the separating state of these fingers. Thus, the liquid can be poured into the filling portion 14 by another hand. As such, even if a single operator carries out this operation, the operation can be performed with sufficiently high accuracy and effectiveness.

<Second Embodiment>

A pouch container 30 according to a second embodiment will be described in detail with reference to FIGS. 8 to 11. In this section, differences from the first embodiment will mainly be described, and the components that are the same as those included in the first embodiment are assigned the same reference numerals as in the first embodiment, and their repeated descriptions will be omitted.

Figure 8:
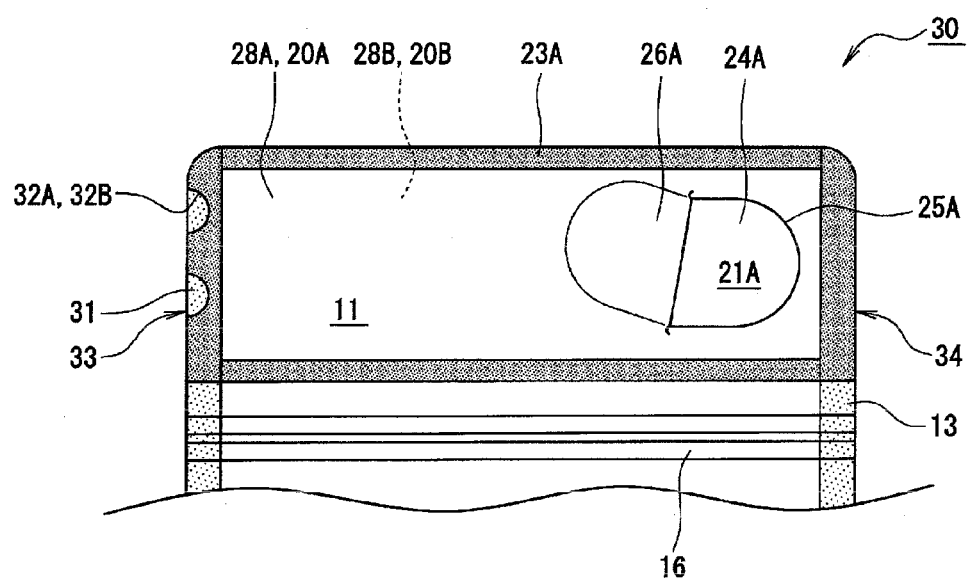
FIG. 8 shows a front view of a pouch container according to a second embodiment of the present invention, and is an enlarged view of the bag-shaped portion.

As shown in FIG. 8, the pouch container 30 differs from the pouch container 10 in that the other widthwise end portions of the bag-shaped portions 20A and 20B are joined to provide seal portions 31. The seal portions 31 are provided on the side opposite to the insertion openings 24A and 24B. In the embodiment shown in FIG. 8, cutouts 32A and 32B are formed on the other widthwise end portions of the sheets 21A and 21B, respectively, and the seal portions 31 are point seal portions which are provided only at the portions in which the cutouts 32A and 32Ba are formed. More specifically, the seal portions are portions in which the inner surfaces of the front surface sheet 11 and back surface sheet 12 are joined via the cutouts 32A and 32B. In this way, a closed portion 33 in which the other widthwise end portions of the pair of flap-shaped portions 28A and 28B are integrated to each other is provided. Meanwhile, the one widthwise end portions of the pair of flap-shaped portions 28A and 28B are formed into an opened portion 34 in which they are separated from each other.

Figure 9:
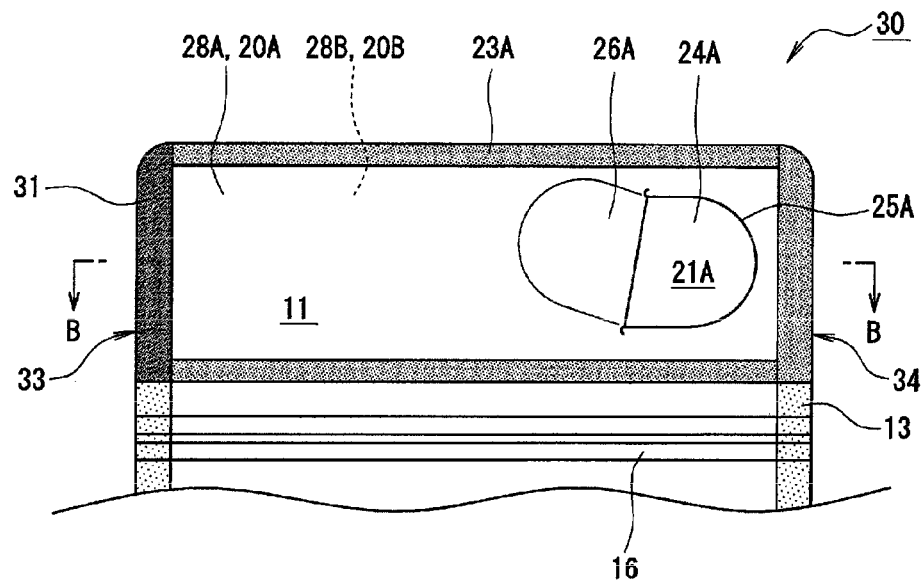
FIG. 9 shows a variant of the pouch container according to the second embodiment of the present invention.
Figure 10:
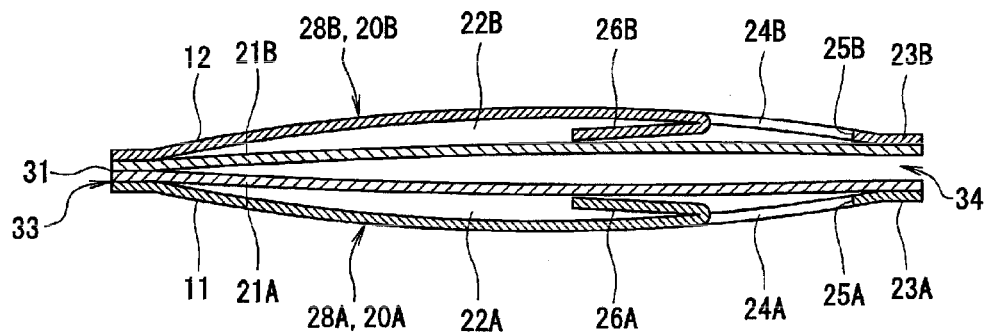
FIG. 10 shows a schematic view of a cross section taken along line B-B in FIG. 9.

FIGS. 9 and 10 show variants of the embodiment shown in FIG. 8. In the embodiment shown in FIGS. 9 and 10, the seal portion 31 is formed to have no gap along the vertical direction of the bag-shaped portions. The seal portion 31 is preferably formed by joining the sheets 21A and 21B to each other. The seal portion 31 is formed by a heat sealing process using the sheets 21A and 21B having a so-called double-sided heat sealing property, each having sealant layers in all or part of the region on the respective side. In order that the sheets 21A and 21B are heat sealed only in the other widthwise end portions of the bag-shaped portions 20A and 20B, for example, the softening temperature of the sealant layers on the surfaces on which the sheets 21A and 21B face each other can be set higher than that of the sealant layers on the surfaces on which the sheets 21A and 21B face the wall surface sheets. Further, the sheets 21A and 21B may be adhered to each other using an adhesive.

Figure 11:
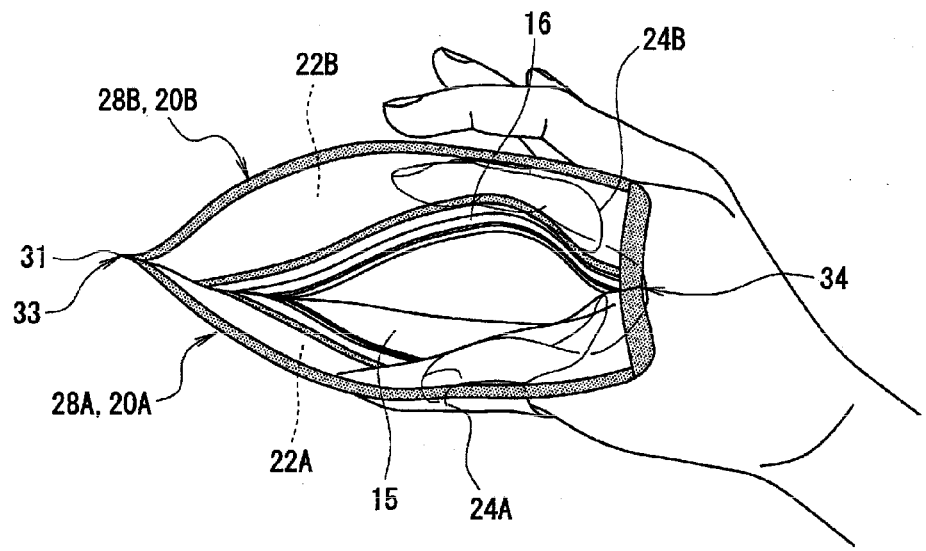
FIG. 11 shows a top view of the pouch container according to the second embodiment of the present invention, in which the filling opening is open.

As shown in FIG. 11, by providing the seal portion 31 and joining the other widthwise end portions of the bag-shaped portions 20A and 20B to each other, thereby providing the closed portion 33, the opening 15 can be opened more easily. For example, the opening 15 can be opened more widely with a smaller force than when the other widthwise end portions are not joined to each other (first embodiment). In the first embodiment, for example, when the space between the thumb and the index finger is opened, the bag-shaped portions are sometimes folded to the outside at their base portions, etc. and only the bag-shaped portions are opened to the outside, by fixing the other widthwise end portions at the seal portion 31 and preventing the other widthwise end portions from being opened to the outside, the force easily acts in the direction to open the opening 15. Thus, the opening ability of the opening 15 is further enhanced.

Further, by forming the seal portion 31 to have no gap along the vertical direction of the bag-shaped portions, it is possible to prevent the nutrient from leaking from the other widthwise end portions when it is poured. Further, these other widthwise end portions function as a funnel and enable the nutrient to be poured along the seal portion 31.

<Third Embodiment>

A pouch container 40 according to a third embodiment will be described with reference to FIGS. 12 to 16. Hereinafter, differences from the above-described embodiments will mainly be described, and the components that are the same as those included in the above-described embodiments are assigned the same reference numerals as in the above-described embodiments, and their repeated descriptions will be omitted.

Figure 12:
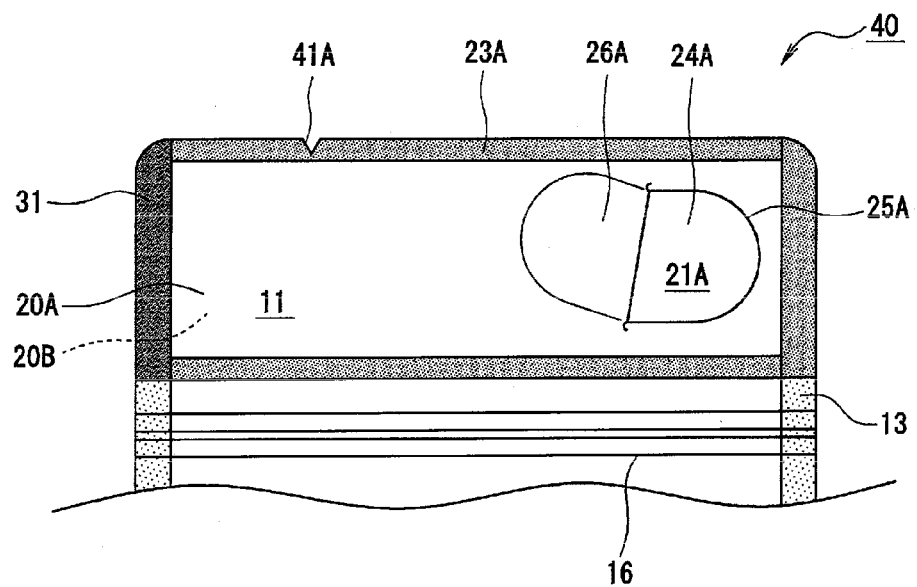
FIG. 12 shows a front view of a pouch container according to a third embodiment of the present invention, and is an enlarged view of the bag-shaped portion.
Figure 13:
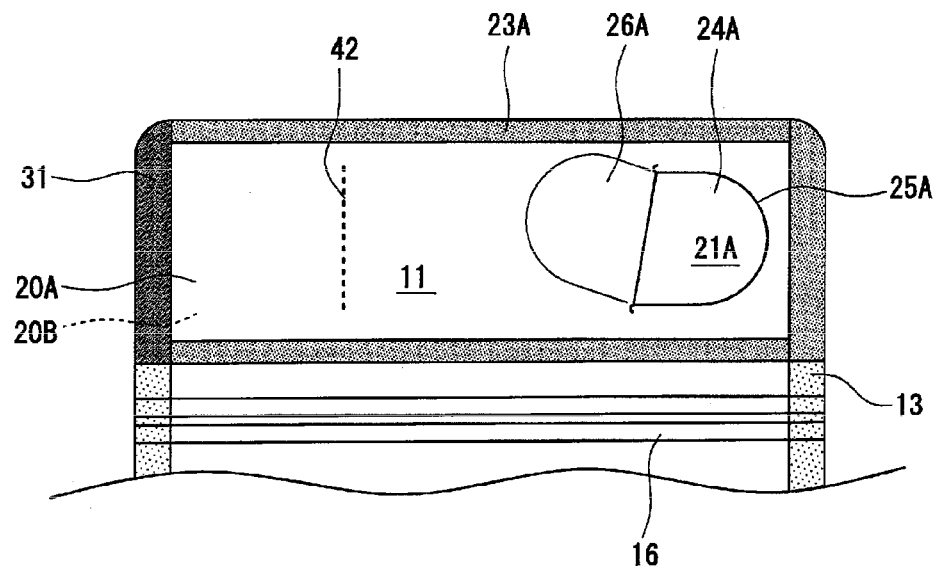
FIG. 13 shows a variant of the pouch container according to the third embodiment of the present invention.
Figure 14:
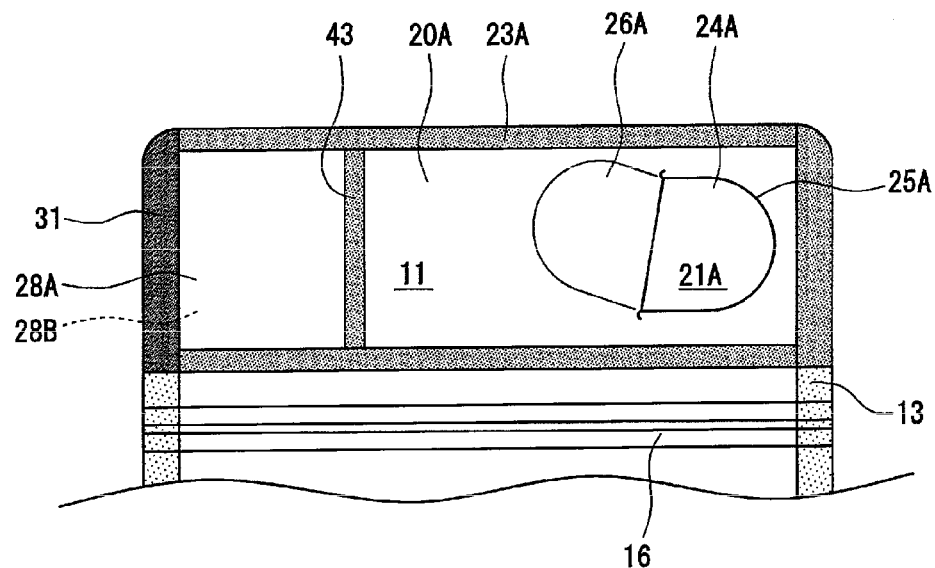
FIG. 14 shows a variant of the pouch container according to the third embodiment of the present invention.

As shown in FIG. 12, the pouch container 40 differs from the pouch container 30 in that there are provided notches 41A and 41B functioning as fold-forming portions in the edge seal portions 23A and 23B located along the upper edge of the bag-shaped portions 20A and 20B. The notches 41A and 41B are formed at positions between the widthwise center portion and the other widthwise end portions of the bag-shaped portions 20A and 20B, where the fingertips inserted into the bag-shaped portions cannot reach; that is, for example, the positions between the positions of the fingertips inserted into the bag portions and the other widthwise end portions.

Figure 15:
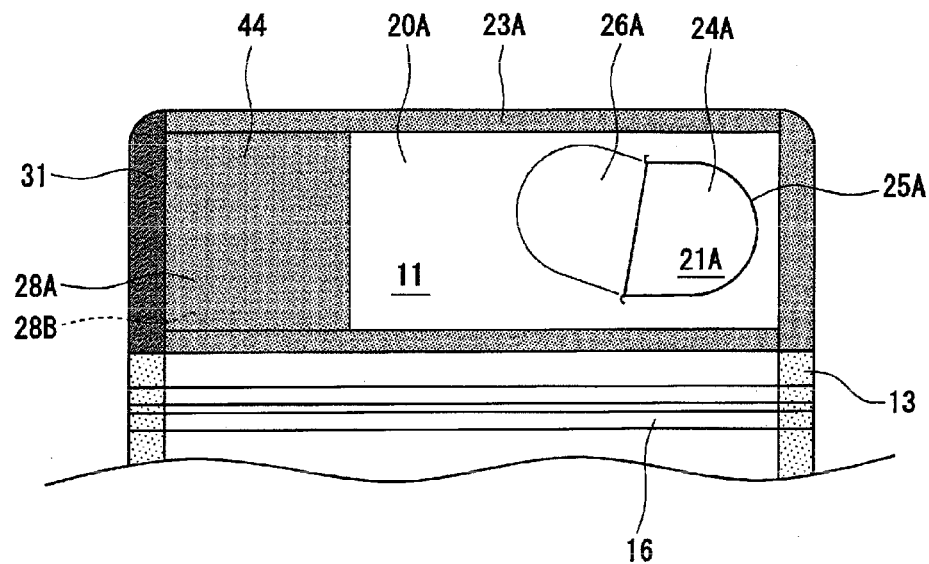
FIG. 15 shows a variant of the pouch container according to the third embodiment of the present invention.

The fold-forming portions have a function of locally increasing or reducing the rigidity of the bag-shaped portions to form vertically extending bent portions (for example, bent lines). The fold-forming portion is not limited to the notch, and may be a vertically extending perforation line 42 shown in FIG. 13 or a vertically extending seal portion 43 shown in FIG. 14. Further, a half-cut line may be formed instead of the perforation line 42. As shown in FIG. 15, a wide seal portion 44 which extends from the position of the seal portion 43 over the other widthwise end portion may be formed. The seal portions 43 and 44 can be formed, for example, by heat sealing the inner surfaces of the bag-shaped portions. The perforation line 42 and the sealed portions 43 and 44 are preferably formed not only in the bag-shaped portion 20A but also in the bag-shaped portion 20B.

Figure 16:
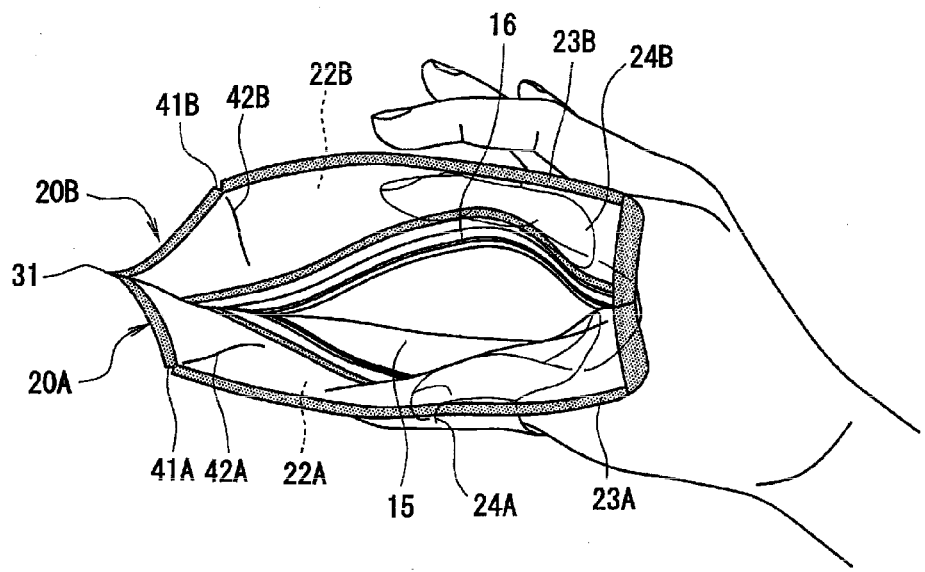
FIG. 16 shows a top view of the pouch container according to the third embodiment of the present invention, in which the filling opening is open.

As shown in FIG. 16, by providing the notches 41A and 41B further inside than the fingertips inserted into the bag-shaped portions 20A and 20B, it is possible to further improve the opening ability of the opening 15. The portions located further inside than the fingertips in the bag-shaped portions 20A and 20B are curved from the positions of the fingers to the other widthwise end portions, or are bent at the positions of the fingertips (see FIG. 11). By providing the notches 41A and 41B, the bag-shaped portions 20A and 20B are bent preferentially at the positions where the notches are formed, to thereby achieve a structure in which folding lines 42A and 42B are easily formed along the vertical direction. This structure enables the portions located further inside than the fingertips to extend straight along the fingers to the positions of the folding lines 42A and 42B, to thereby open the opening 15 more easily. When seen from the top, the opening shape of the opening 15 has a substantially home-plate shape (pentagon with parallel sides).

<Fourth Embodiment>

Figure 17:
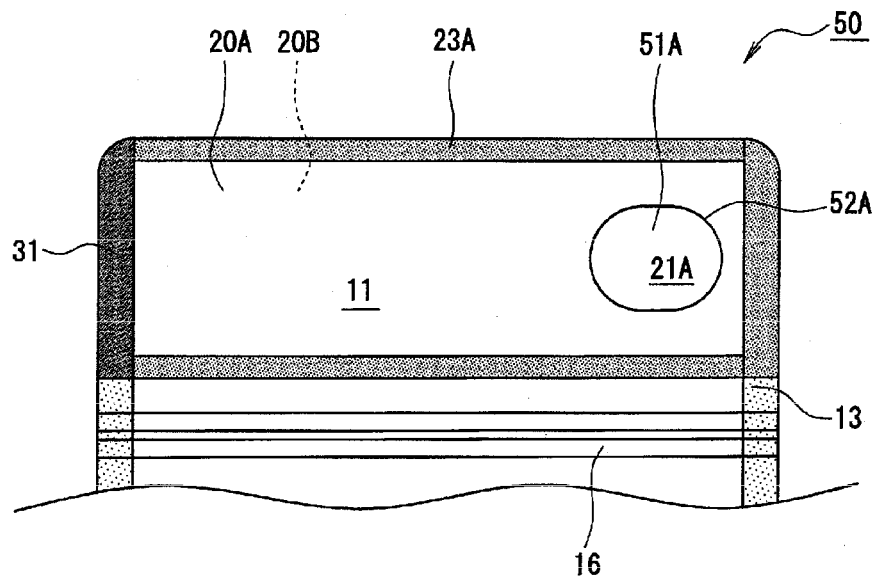
FIG. 17 shows a front view of a pouch container according to a fourth embodiment of the present invention, and is an enlarged view of the bag-shaped portion.

A pouch container 50 according to a fourth embodiment will be described with reference to FIG. 17.

The pouch container 50 differs from the pouch container 30 in that an insertion opening 51A is formed by an endless slit line 52A, instead of the slit line 25A having the substantially U-shape in the front view (the same is applied to the bag-shaped portion 20B). That is, the insertion opening 51A is a though hole which is formed by punching the front surface sheet 11, and it has no tongue portion on its periphery. The insertion opening 51A has a substantially ellipse shape in front view, and its longitudinal axis extends along the width direction. However, the shape of the insertion opening 51A is not limited to this, and it may have a perfect circle shape, a semicircle shape, or a polygonal shape, such as a square, in front view.

<Fifth Embodiment>

Figure 18:
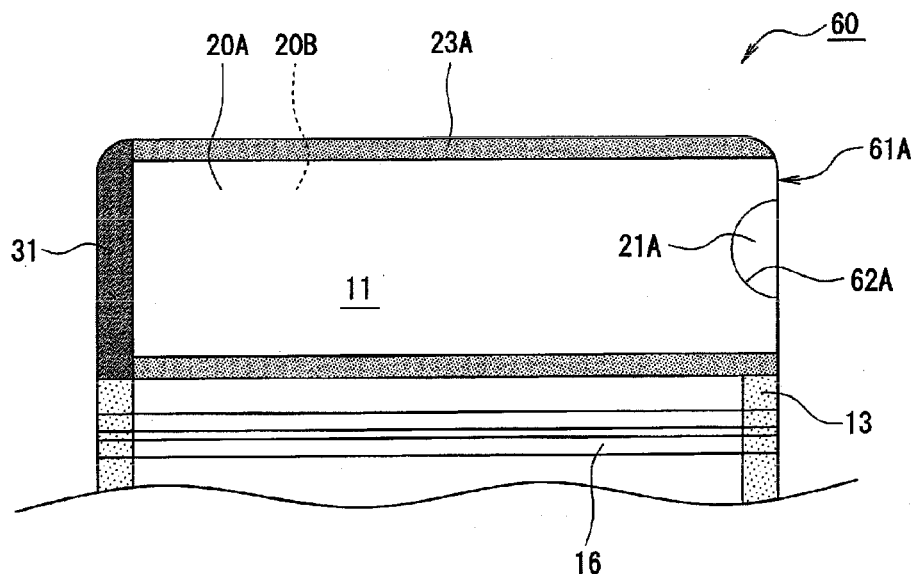
FIG. 18 shows a front view of a pouch container according to a fifth embodiment of the present invention, and is an enlarged view of the bag-shaped portion.

A pouch container 60 according to a fifth embodiment will be described with reference to FIG. 18. The pouch container 60 differs from the pouch container 30 in that it does not have the edge seal portion 23A on the one widthwise end portion of the bag-shaped portion 20A, but has an insertion opening 61A which enables insertion of the finger from the one widthwise end portion (the same applies to the bag-shaped portion 20B). The insertion opening 61A is an opening directed along the width direction and is formed between the front surface sheet 11 and the sheet 21A. There can be formed a cutout 62A in the one widthwise end portion of the front surface sheet 11 constituting the bag-shaped portion 20A, and this allows the insertion opening 61A to be opened easily, thereby improving ease of insertion of the finger.

<Sixth Embodiment>

Figure 19:
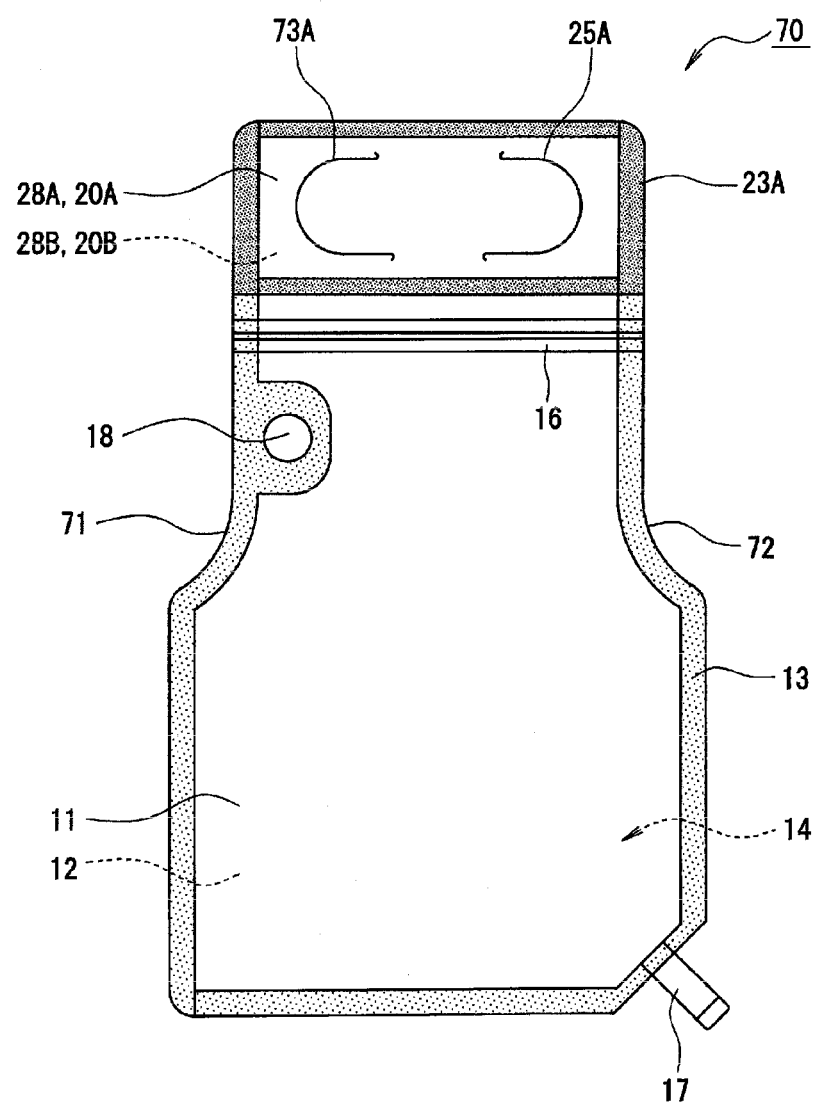
FIG. 19 shows a front view of a pouch container according to a sixth embodiment of the present invention.

A pouch container 70 according to a sixth embodiment will be described with reference to FIG. 19.

The pouch container 60 differs from the pouch container 10 in that it has cut portions 71 and 72 on respective widthwise sides of the upper portion of the container; the width of the upper portion of the container is smaller than that of the lower portion of the container; and two slit lines 25A and 73A which form respective insertion openings are provided in the bag-shaped portion 20A (the same applies to the bag-shaped portion 20B). The slit line 73A is formed in close proximity to the other widthwise end portion of the bag-shaped portion 20A, and, like the slit line 25A, has a substantially U-shape in front view. The slit line 25A is designed to receive the finger inserted from the side of the one widthwise end portion, while the slit line 73A is designed to receive the finger inserted from the side of the other widthwise end portion. Because, in the pouch container 70, the width of the upper half is narrow, and the length of the bag-shaped portion is short in the width direction, the finger inserted into the bag-shaped portion is positioned, for example, in the widthwise center portion. Alternatively, it is positioned in close proximity to the opposite widthwise end portion beyond the widthwise center portion. This enables the force of opening the opening 15 to act on the entire width of the opening 15, thereby allowing the opening 15 to be opened widely with a small force. Further, this enables the opening 15 to be maintained in the open state more easily.

<Seventh Embodiment>

Figure 20:
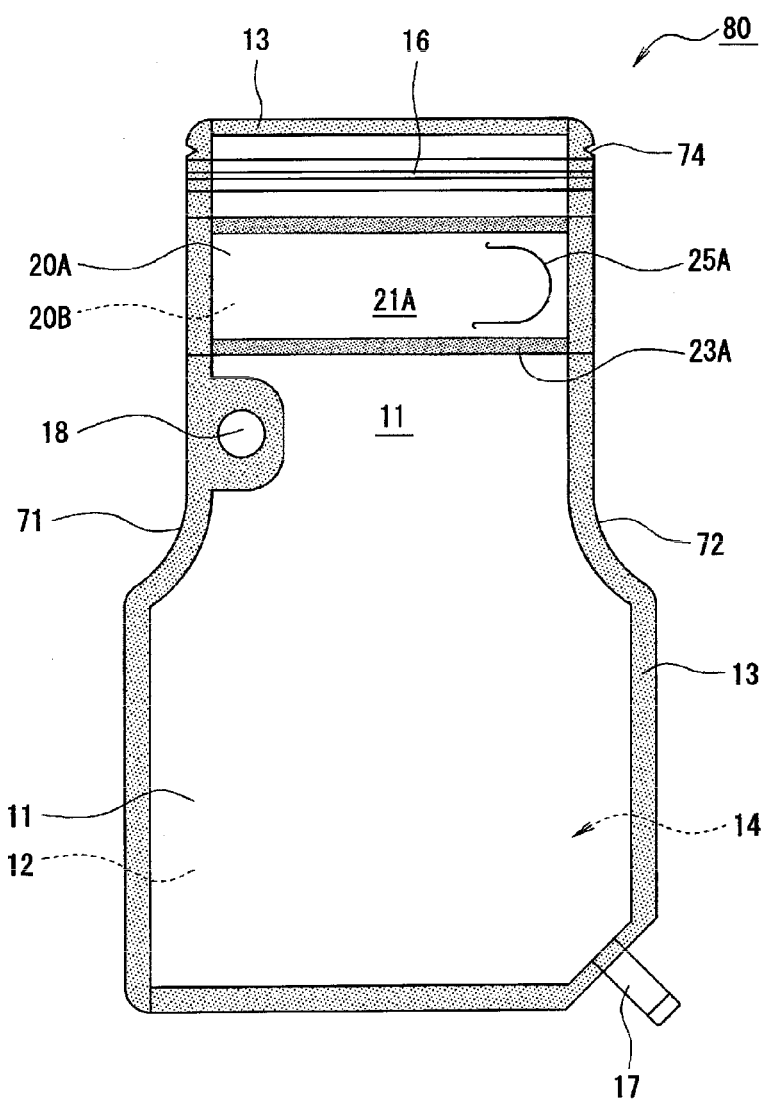
FIG. 20 shows a front view of a pouch container according to a seventh embodiment of the present invention.

A pouch container 80 according to a seventh embodiment will be described with reference to FIG. 20.

Although the pouch container 80 has the same outer shape as the pouch container 70, it differs from the pouch container 70 in that it has the bag-shaped portion 20A below the zipper (the same applies to the bag-shaped portion 20B). The bag-shaped portion 20A is formed by joining the sheet 21A to the inner surface of the front surface sheet 11. The slit line 25A is formed in the front surface sheet 11. There is formed an edge seal portion 13 for enhancing the sealing property of the filling portion 14 in the portion of the pair of wall surface sheets located above the zipper 16. Further, there is formed a notch 74 for opening the pouch container, between the edge seal portion 13 and the zipper 16.

The design of the above-described embodiment may be changed without departing from the object of the present invention. For example, although the above-described embodiment is described by reference to the example in which the bag-shaped portion is formed by providing the bag-shaped portion-forming sheet on the inner surface of the wall surface sheet, the bag-shaped portion may be formed by providing the bag-shaped portion-forming sheet on the outer surface of the wall surface sheet.

<Eighth Embodiment>

A pouch container 90 according to an eighth embodiment will be described with reference to FIGS. 21 to 23.

Figure 21:
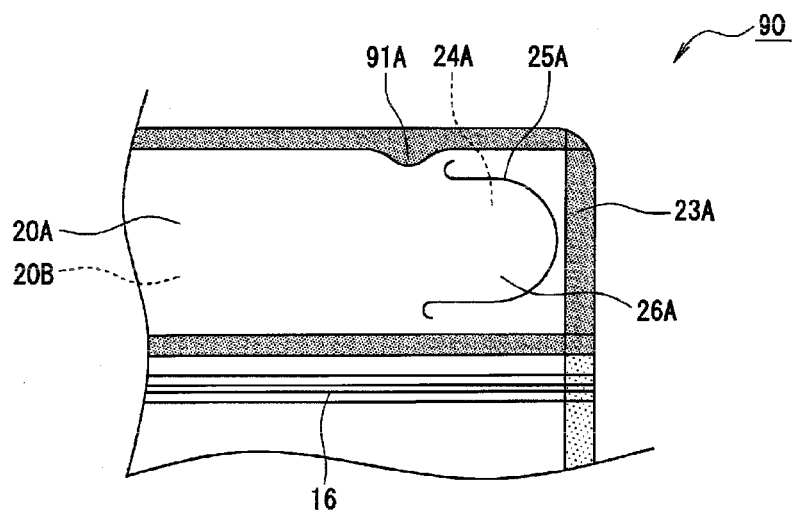
FIG. 21 shows a front view of a pouch container according to an eighth embodiment of the present invention, and is an enlarged view of the bag-shaped portion.

As shown in FIG. 21, the pouch container 90 has a finger-hooking seal portion 91A in which the inner surfaces of the bag-shaped portion 20A are joined to each other (the same applies to the bag-shaped portion 20B). More specifically, the finger-hooking seal portion 91A is provided in the upper portion on the side of the other widthwise end portion of the insertion opening 24A. The finger-hooking seal portion 91A is preferably positioned on the side of the other widthwise end portion of the insertion opening 24A of the bag-shaped portion 20A, and near the upper edge of the insertion opening 24A. Further, the finger-hooking seal portion 91A is preferably provided in a position which does not interfere with the tongue piece 26A when the tongue piece 26A is folded to the inside; that is, a position on the upper portion side of the tongue piece 26 folded to the inside. If there is no tongue piece 26A, the finger-hooking seal portion 91A is preferably provided in the upper half of the bag-shaped portion 20A and, more preferably, within a region of approximately one-third of the vertical length of the bag-shaped portion from the upper edge of the bag-shaped portion 20A.

The finger-hooking seal portion 91A is provided by causing a portion of the edge seal portion 23A formed along the upper end of the bag-shaped portion 20A to protrude to the lower portion side. No particular limitation is imposed on the shape of the finger-hooking seal portion 91A, so long as it is a shape for hooking the thumb inserted from the insertion opening 24A without difficulty, and it may be, for example, a mountain-shaped protrusion as shown in FIG. 21.

Figure 22:
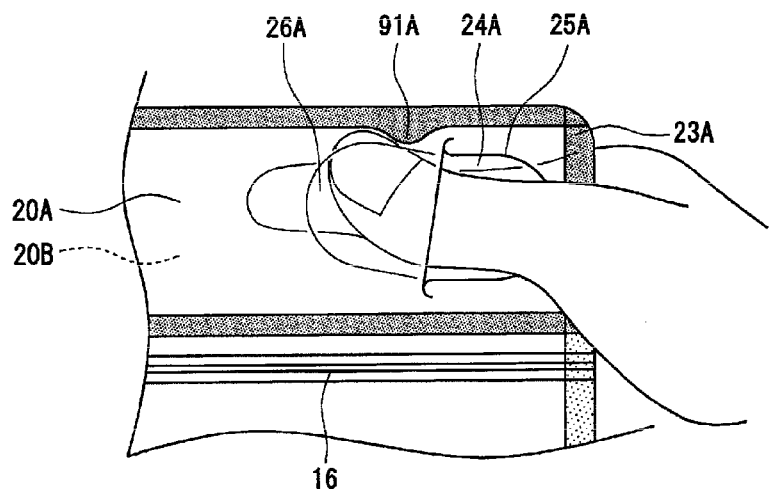
FIG. 22 shows a top view of the pouch container according to the eighth embodiment of the present invention, in which the filling opening is open.

As shown in FIG. 22, in the pouch container 90, the tip of the thumb can be caught in the finger-hooking seal portion 91A. Although, compared to the index finger, it is more difficult to insert the thumb deep into the inside of the bag-shaped portion, by providing the finger-hooking seal portion 91A, the thumb is better caught in the bag-shaped portion 20A, and the force acts more easily in the direction to open the opening 15. The pouch container 90 is particularly advantageous for use, for example, by women with smaller hands.

Figure 23:
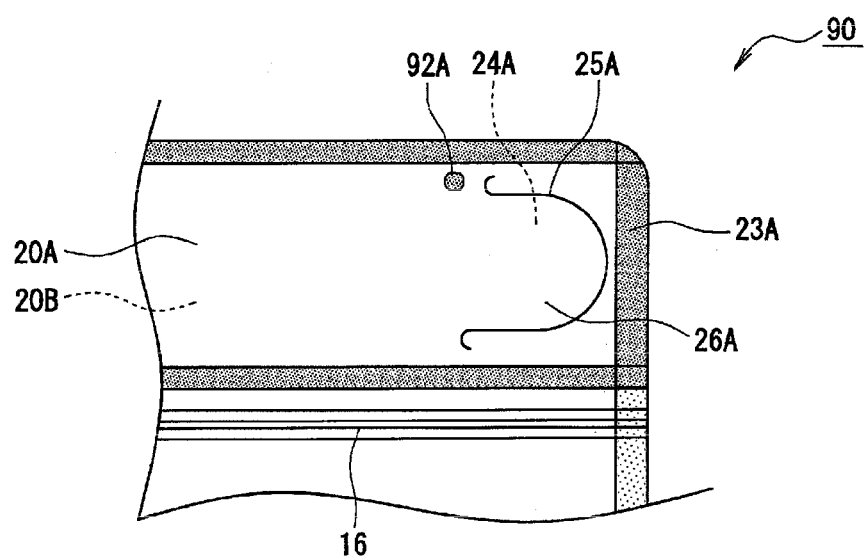
FIG. 23 shows a variant of the pouch container according to the eighth embodiment of the present invention.

As shown in FIG. 23, a finger-hooking seal portion 92A may be provided in the form of a point seal portion at a position separated from the edge seal portion 23A. In this case, it is also preferable to provide the finger-hooking seal portion 92A near the upper end of the insertion opening 24A on the upper portion side of the tongue piece 26A which is folded to the inside.

<Ninth Embodiment>

A pouch container 100 according to a ninth embodiment will be described with reference to FIGS. 24 to 28. For the sake of easy understanding, in FIGS. 26 and 27, the pouch container 100 is shown such that the scale size in the front and back direction is larger than that in the vertical direction.

Figure 24:
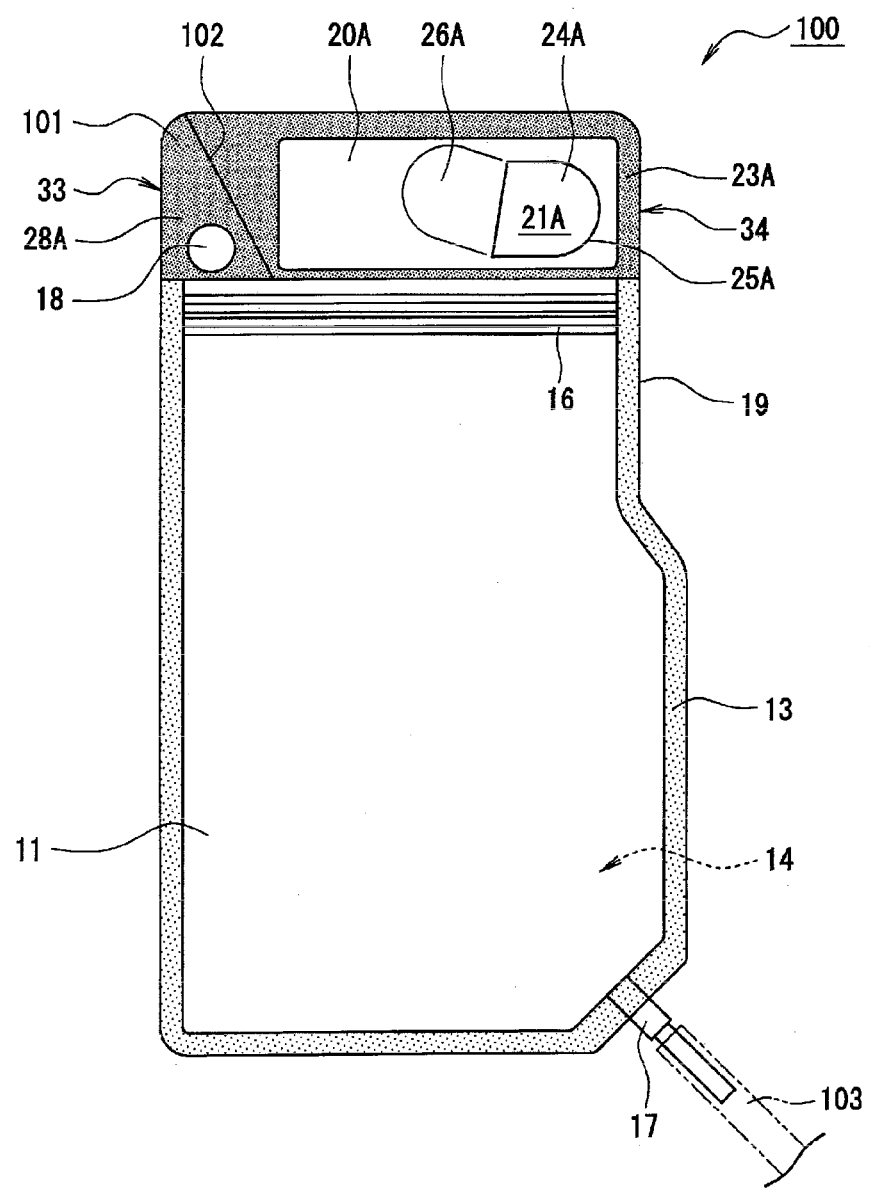
FIG. 24 shows a front view of a pouch container according to a ninth embodiment of the present invention.
Figure 25:
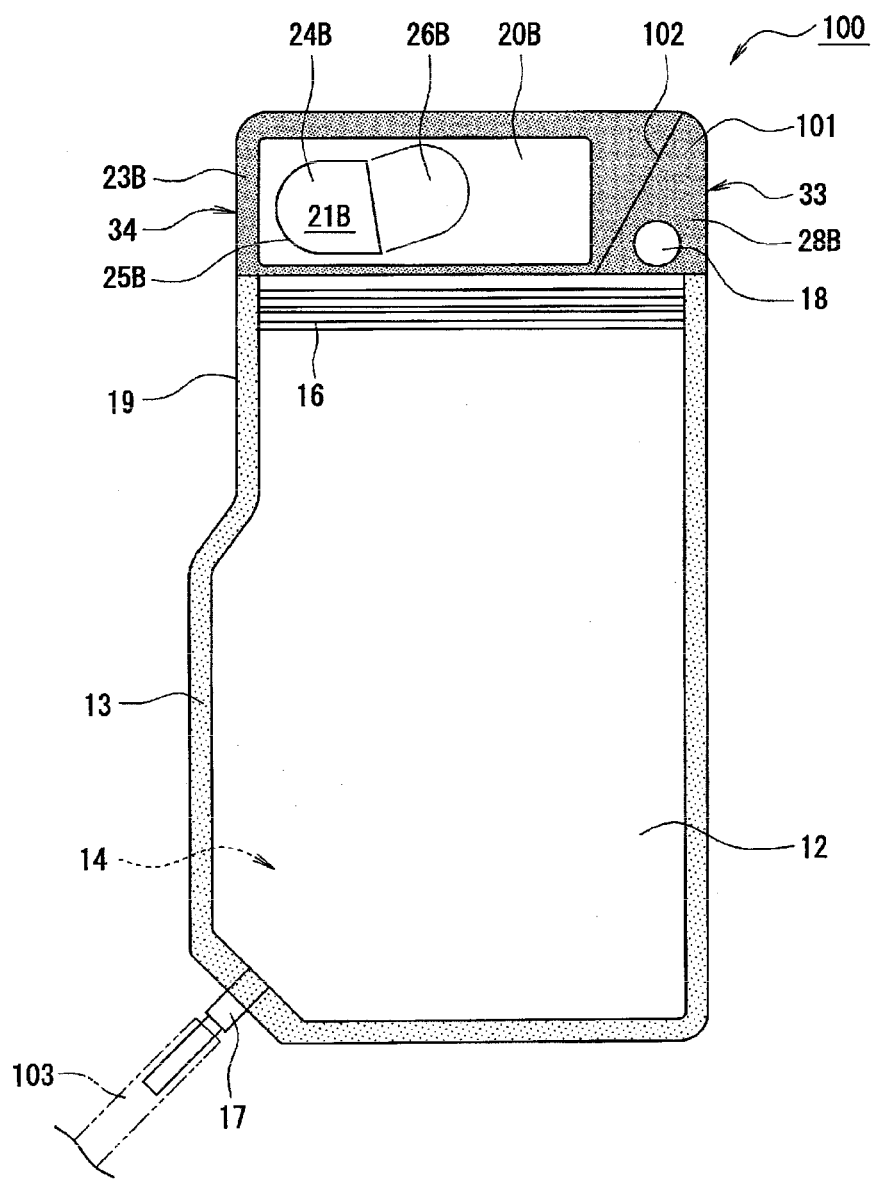
FIG. 25 shows a back view of the pouch container shown in FIG. 24.
Figure 26:
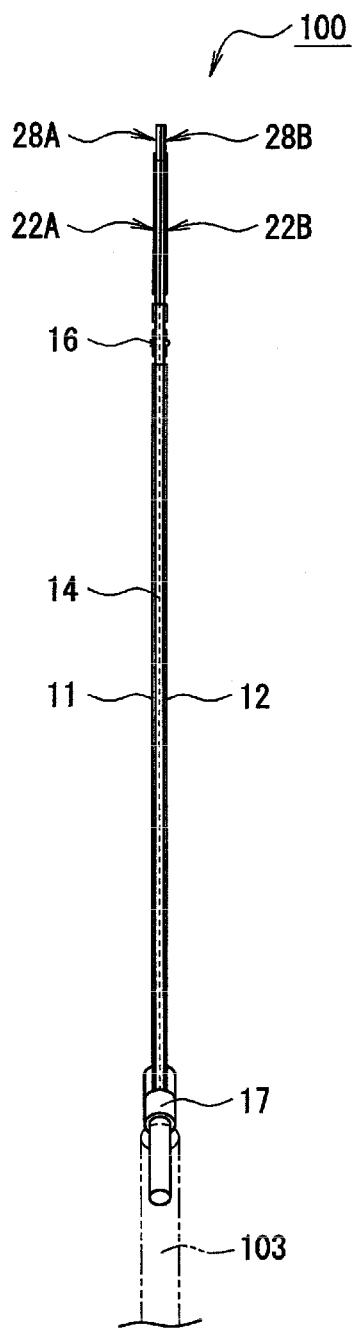
FIG. 26 shows a right-side view of the pouch container shown in FIG. 24.
Figure 27:
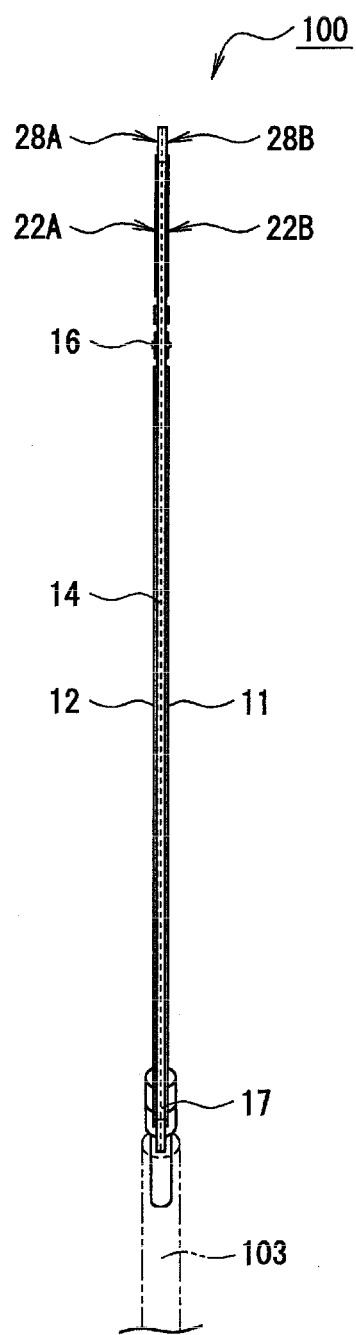
FIG. 27 shows a left-side view of the pouch container shown in FIG. 24.

As shown in FIGS. 24 and 25, in the pouch container 100, a seal portion 101 forming the closed portion 33 is inclined from the closed portion 33 side to the opened portion 34 side (in FIG. 24, from the left side to the right side) as it extends from the upper ends of the flap-shaped portions 28A and 29A to the inner side (lower side) of the flap-shaped portions 28A and 29A. Thus, the pair of flap-shaped portions 28A and 28B are tilted and joined on the closed portion 33 side, to thereby form an inclined guide portion 102 which is inclined such that when the below-described flap-shaped portions 28A and 28B are opened, the aperture of the flap-shaped portions 28A and 28B in the width direction gradually becomes smaller from the upper side toward the opening 15.

On the other hand, in the opened portion 34, the pair of flap-shaped portions 28A and 28B are not joined to each other in half or more of the region extending from the upper end portion (the tip portion in the extending direction from the zipper 16) toward the lower side (the direction to the zipper 16), and the pair of flap-shaped portions 28A and 28B are opened such that they can be separated from each other.

In the present embodiment, the bag-shaped portions 20A and 20B having the insertion openings, through which the fingers can be inserted from the opened portion 34 side to the closed portion 33 side, are formed in the pair of flap-shaped portions 28A and 28B. Adjustment of the inclination angle of the bent portion (the base line of the tongue piece 26A) enables adjustment of the angle of the bag-shaped portions 20A and 20B; that is, the angle of the fingers to be inserted.

Further, the suspension hole 18, which is the through hole, is formed outside (upward from) the opening 15. In the present embodiment, the suspension hole 18 is formed so as to penetrate the pair of flap-shaped portions 28A and 29A that are fixed to each other in an overlapping manner on the closed portion 33 side of the pair of flap-shaped portions 28A and 28B. The suspension hole 18 may be formed in an extended piece which is formed on only one of the flap-shaped portions so as to extend from the outer periphery portion thereof. By inserting a hanger hook or the like though the suspension hole 18, it is possible to hang the pouch container 100 from the infusion stand (not shown) and support it.

Figure 28:
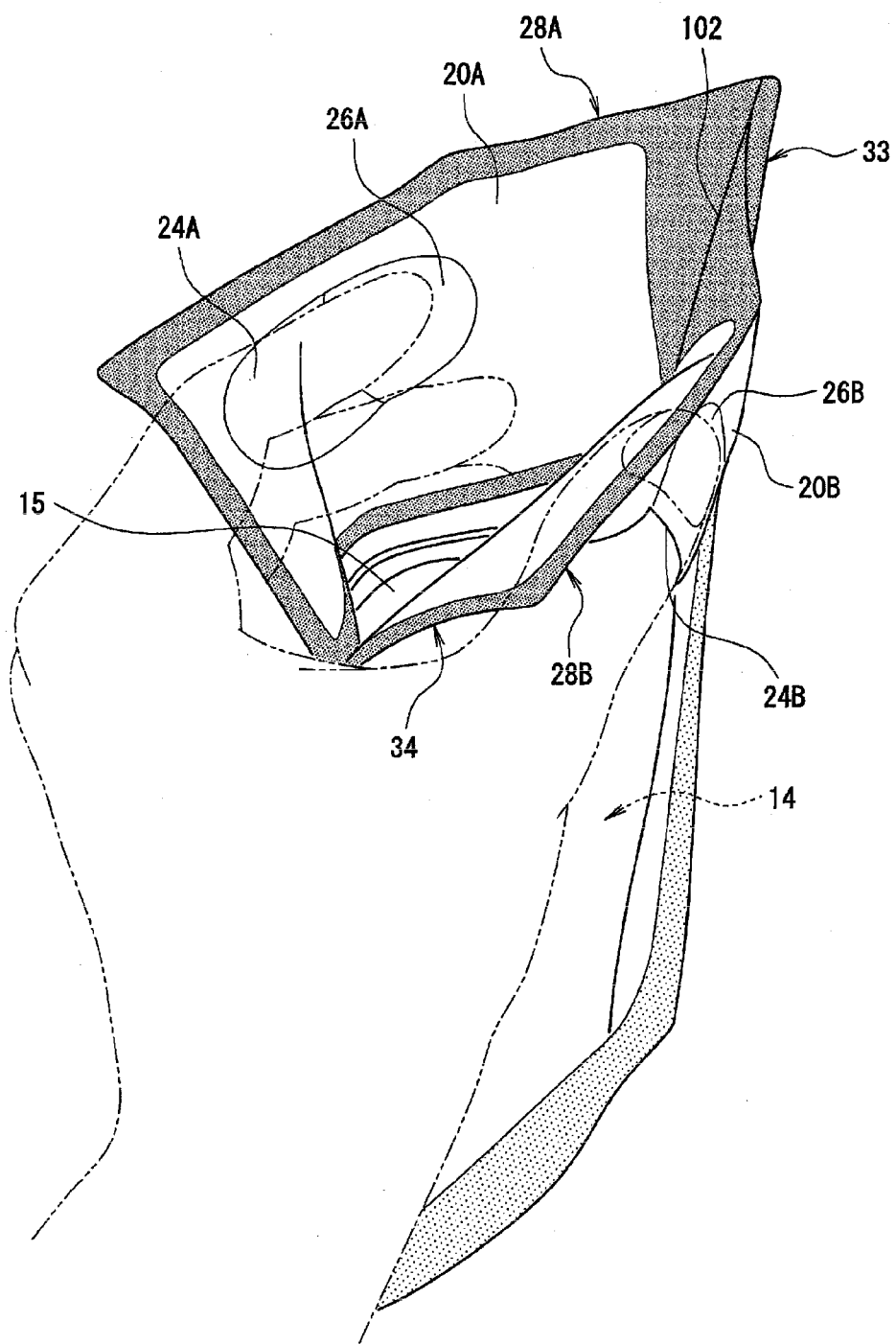
FIG. 28 shows a perspective view of the pouch container shown in FIG. 24, in which the filling opening is open.

FIG. 28 shows the flap-shaped portions 28A and 28B which are opened by the thumb and the index finger inserted into the pair of bag-shaped portions 20A and 20B while holding the pouch container 100 by the left hand. A right-handed person can pour the liquid into the filling portion 14 more accurately in the state shown in FIG. 28. Alternatively, when the pouch container 100 is held by the opposite hand, the pouch container 100 can be maintained in an open state more stably. Therefore, it is preferable that the front and back sides of the pouch container 100 are symmetrical. The fingers to be inserted into the pair of bag-shaped portions 20A and 20B are not limited to the thumb and the index finger, and, for example, the thumb and the middle finger can also be inserted. The shapes of the pair of bag-shaped portions 20A and 20B are preferably formed in accordance with the shapes of the fingers that are actually inserted thereinto.

Like the other pouch containers in the above-described embodiments, in the pouch container 100, by operating the thumb and the index finger in the opening direction, the space between the flap-shaped portions 28A and 28B is opened, and the flap-shaped portions 28A and 28B are separated from each other in the separation direction, which is opposite to the overlap direction. Then, when the opening action force is further applied, the opening 15, on which the zipper 16 connected to the pair of flap-shaped portions 28A and 28B is provided, is changed from the closed state to the open state.

Further, the closed portion 33 and the opened portion 34 are respectively provided on the side of the other widthwise end portion and the side of the one widthwise end portion of the pair of flap-shaped portions 28A and 28B, and the space between the pair of flap-shaped portions 28A and 28B is opened from the opened portion 34 side. Therefore, as compared to the case where both ends of the flap-shaped portions are closed, the container upper portion can be opened widely. In doing so, the liquid can be easily poured into the filling portion 14, and, thus, the operator's mental and operational load can be reduced.

In the pouch container 100, the edge portion is inclined on the closed portion 33 side of the pair of flap-shaped portions 28A and 28B, and the inclined guide portion 102 is formed such that the aperture gradually becomes smaller toward the opening 15 when the pair of flap-shaped portions 28A and 28B are opened. This enables the liquid to be poured into the filling portion 14 along the inclined surface of the inclined guide portion 102. Thus, as the liquid is easily collected into the opening 15, a risk of spilling the liquid can be reduced, and operation can be performed more accurately without adding further burden to the operator. That is, the inclined guide portion 102 can demonstrate effects as a funnel.

<Tenth Embodiment>

Figure 29:
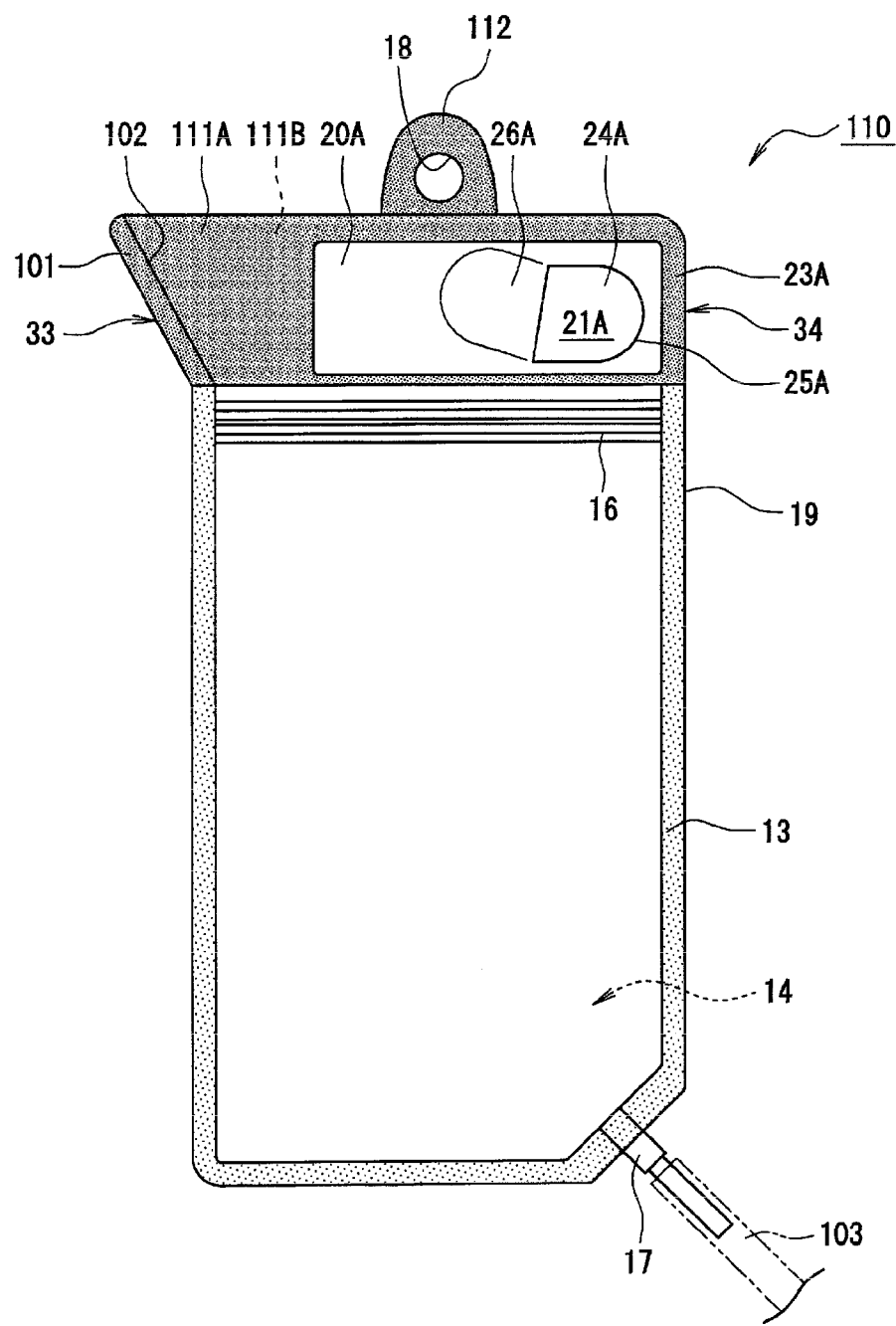
FIG. 29 shows a front view of a pouch container according to a tenth embodiment of the present invention.
Figure 30:
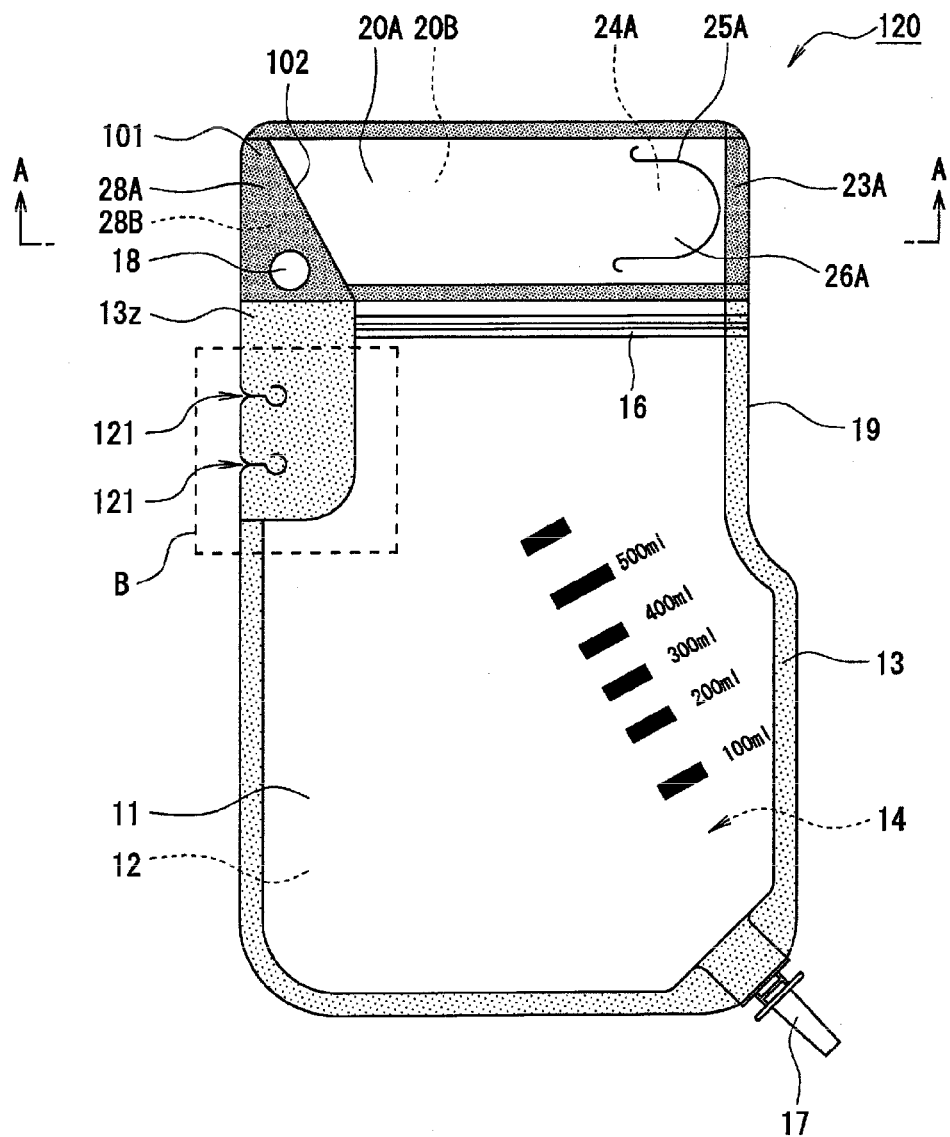
FIG. 30 shows a front view of a pouch container according to an eleventh embodiment of the present invention.
Figure 31:
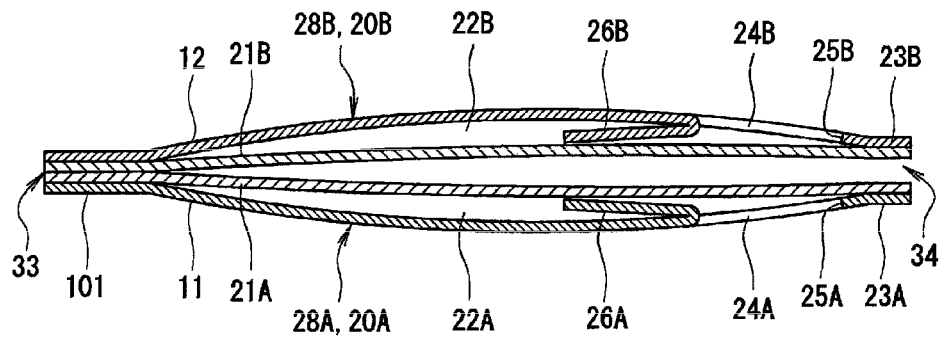
FIG. 31 shows a schematic view of a cross section taken along line A-A in FIG. 30.
Figure 32:
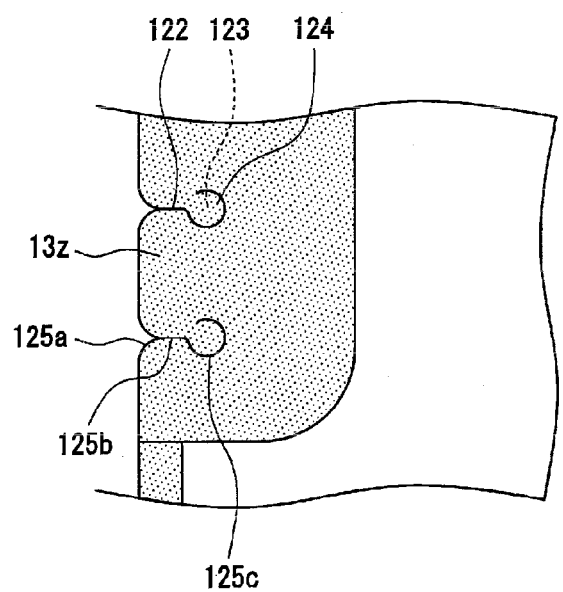
FIG. 32 shows an enlarged view of portion B in FIG. 30.

A pouch container 110 according to a tenth embodiment will be described with reference to FIG. 29.

The pouch container 110 differs from the pouch container 100 in that the length of a pair of flap-shaped portions 111A and 111B in the width direction is longer on the closed portion 33 side than the length of the bag body, which is the portion below the zipper 16, in the width direction. Further, in the pouch 110, the suspension hole 18 through which the hanger hook or the like is inserted is formed in a protrusion piece 112 which is provided so as to protrude upward from at least one of the pair of flap-shaped portions 111A and 111B. The protrusion piece 112 and the suspension hole 18 are provided so as to be positioned approximately in the center of the filling portion 14 and the zipper 16 in the width direction. Further, in the container pouch 110, the bag body does not have the widened portion.

In the pouch container 110 having such a structure, the inclined guide portion 102, which is the edge portion on the closed portion 33 side of the pair of flap-shaped portions 111A and 111B, is formed so as to extend from the zipper 16 outward in the width direction above the opening 15. By forming the pair of flap-shaped portions 111A and 111B so as to have the opening width larger than the zipper 16 in the opening 15 in this manner, the aperture of the space between the flap-shaped portions 111A and 111B can be made larger than the pouch container 100 or the like. Therefore, the operation of pouring the liquid into the filling portion 14 through the opening 15 can be much easier, and the operator's mental and operational load can be further reduced.

Because, in the present embodiment, the suspension hole 18 is provided approximately in the center in the width direction of the bag body, the outlet portion 17 may also be provided approximately in the center in the width direction of the bag body. Further, the closed portion 33 (inclined guide portion 102) is not limited to the inclined shape linearly extending outward from the opening 15, on which the zipper 16 is provided, and a shape having an inclination angle which changes in a stepwise manner, or a shape having an inclination angle which changes in a curved manner, may also be adopted.

<Eleventh Embodiment>

A pouch container 120 according to an eleventh embodiment will be described in detail with reference to FIGS. 30 to 37.

The pouch container 120 differs from the above-described embodiments in that it has a tube-holding portion 121 which can hold a tube 103 (hereinafter, simply referred to as the "holding portion 121"). The holding portion 121 is preferably formed in the widened seal portion 13z of the edge seal portion 13, in which the suspension hole 18 is formed. In the present embodiment, two holding portions 121 are formed in the widened seal portion 13z. Although a single holding portion 121 can be provided, it is preferable to form a plurality of holding portions, from the viewpoint of improvement of retention of the tube 103.

The widened seal portion 13z is a portion which is obtained by widening the edge seal portion 13 locally, and, in the present embodiment, one widened seal portion 13z is provided on the other widthwise end side in the upper portion of the container. The widened seal portion 13z is formed to extend from the portion below the zipper 16 to the upper end of the container beyond the zipper 16, such that the width gradually becomes smaller toward the upper end of the container in the portion above the zipper 16. In the portion above the zipper 16 (flap-shaped portions 28A and 28B), four sheets are joined to each other to thereby form the widened seal portion 13z, and the shape of the seal portion is the same as that of the pouch container 100. That is, the other widthwise end portion of the flap-shaped portions 28A and 28B becomes the closed portion 33, and the inclination guide portion 102 is formed.

The two holding portions 121 are formed in a vertical arrangement in the widened seal portion 13z, in which the suspension hole 18 is formed. Each holding portion 121 is preferably formed below the suspension hole 18. In doing so, even if the container is hung from the hanger or the like by hooking the suspension hole 18, the tube 103 is easily attached to the holding portions 121. Further, from the viewpoint of improvement of operability, etc., it is preferable to form the holding portions close to each other, and, for example, an interval between them is preferably set to have about twice to five times the length of the diameter of the tube 103 (hereinafter, referred to as "diameter d").

The holding portion 121 is formed by cutting in or cutting out the wall surface sheet from the outer end of the widened seal portion 13z by a length of the diameter d or longer. The lateral length of the holding portion 121 is preferably about 1.5 to five times the diameter d, and, more preferably, about 1.8 to three times the diameter d, from the viewpoints of retaining the tube 103, ensuring the capacity of the filling portion 14, etc. In doing so, the troublesome operation of bending the tube 103 and inserting it into the holding portion 121 becomes unnecessary, and the middle portion of the tube 103 can be easily inserted into the holding portion 121. Here, the "outer end of the widened seal portion 13z" is an end portion along the visible outer line (contour line) of the wall surface sheet. The inner end of the widened seal portion 13z is an end portion along the visible outer line of the filling portion 14. In addition, the term "slit" means a cut in which the wall surface sheet is not cut out, while the term "cutout" means a cut in which the wall surface sheet is cut out.

Preferably, the holding portion 121 has an introduction path 122 having a width smaller than the diameter d and a housing hole 123 having a size equal to or greater than the diameter d. The introduction path 122 is formed so as to have a predetermined length from the outer end of the widened seal portion 13z. The predetermined length is, for example, about 0.5 to three times the diameter d. The housing hole 123 is a portion in which the tube 103 is held and is formed so as to be connected to the introduction path 122. That is, the tube 103 is inserted from the outer end of the wall surface sheet into the housing hole 123 through the introduction path 122, and is caught in the edge portion of the housing hole 123 and held therein. Because both the wall surface sheet and the tube 103 have flexibility, the tube 103 can be inserted into the introduction path 122, even if the width of the introduction path 122 is made smaller than the diameter d.

The introduction path 122 is formed of a cutout 125a having a triangle shape in plane view and a linear slit line 125b. The cutout 125a is formed such that the width of the introduction path 122 is widened outward near the outer end of the widened seal portion 13z. In order to enable smooth insertion of the tube 103, it is preferable to form the cutout 125a such that the entrance of the introduction path 122 is rounded. The slit line 125b is formed so as to extend laterally from the tip of the cutout 125a to the housing hole 123.

The housing hole 123 is formed by an arc-shaped slit line 125c which is connected to the slit line 125b. In the present embodiment, the slit line 125c is formed so as to have a substantially C-shape, and the wall surface sheet remains without being cut out. That is, in the holding portion 121, a tongue piece 124 is provided as a portion surrounded by the slit line 125c and a line connecting between the ends of the slit line. The shape of the housing hole 123, which is opened when the tongue piece 24 is pushed out, is preferably a substantially circle conforming with the shape of the tube 103. Preferably, the size (diameter) of the housing hole 123 is substantially equal to or slightly greater than the diameter d. Because of this, the holding position of the tube 103 is easily adjusted even after the tube 103 is inserted into the housing hole 123.

The tongue piece 124 covers the housing hole 123 when the tube 103 is not inserted into the housing hole 123. In other words, in this state, the housing hole 123 is closed by the tongue piece 124. When the tube 103 is inserted into the housing hole 123, the tongue piece 124 is pushed out in one direction of the front and back directions by the tube 103, thereby opening the housing hole 123 (see FIG. 37). Because, in the present embodiment, the tongue piece 124 is connected to the upper edge portion of the housing hole 123, when the tube 103 is inserted into the housing hole 123, the tongue piece 124 pushes the tube 103 from above, and the tube 103 can be held more stably.

Each holding portion 121 is formed in substantially parallel to the lateral direction. That is, the center of the introduction path 122 substantially coincides with the center of the housing hole 123 in the lateral direction. Therefore, the holding and removing operations can be performed by moving the tube 103 laterally, thereby improving operability. Because, as described above, the holding portion 121 of the present embodiment is formed by the introduction path 122 having a width smaller than the diameter of the tube 103 and the housing hole 123 having a size equal to or greater than the diameter of the tube 103, the tube 103 does not fall easily, even if the holding portions 121 are formed in substantially parallel to the lateral direction.

Figure 33:
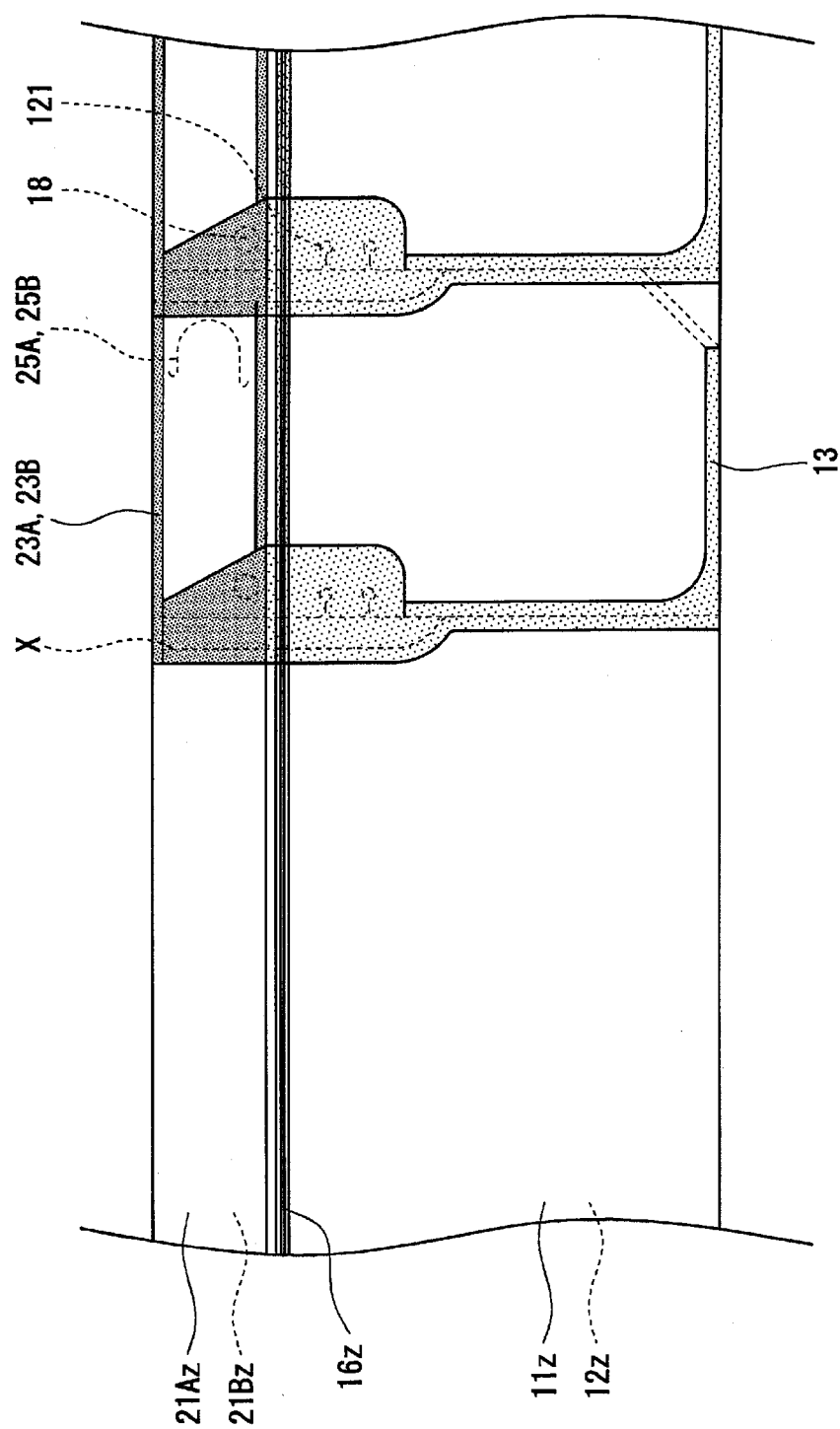
FIG. 33 shows a manufacturing process of the pouch container according to the eleventh embodiment of the present invention.

FIG. 33 shows an example of a manufacturing method of the pouch container 120 having the above-described structure. FIG. 33 schematically shows, among the steps of manufacturing the pouch container 120, the step of laminating continuous bodies of the sheets and forming the seal portions. In this section, differences from the example shown in FIG. 5 will be described.

After the continuous bodies are subjected to the laminating process, the seal portions are formed on them in the heat sealing process. In the heat sealing process, the edge seal portion 13 including the widened seal portion 13z is formed by heat sealing the lower edges of the continuous bodies 11z and 12z and a predetermined portion along the transverse direction. Here, the lower edge of the continuous body is a portion which becomes the lower edge of the pouch container 10, and the predetermined portion is a portion which becomes the side edge of the pouch container 120. Further, in the heat sealing process, the continuous bodies 16z, 21Az, and 21Bz are joined to the continuous bodies 11z and 12z. Because of this, the opening 15 is closed, and the edge seal portions 23A and 23B are formed. The widened seal portion 13z in which the suspension hole 18 and the holding portions 121 are provided is formed over the continuous bodies 11z, 12z, 16z, 21Az, and 21Bz.

Next, the above-described continuous bodies are cut, for example, along an intended cut line X using a die cut roll, etc., and are divided into individual container sizes. The above-described heat sealing and cutting may be performed simultaneously. Further, at this time, or in a separate step, the suspension hole 18, the slit lines 25A and 25B, the cutout 125a, and the slit line 125a and 125c are formed. Thus, the bag-shaped portions 20A and 20B having the internal spaces 22A and 22B into which the finger can be inserted and the hosing portions 121 into which the tube 103 can be inserted are formed. Finally, the outlet portion 17 is attached, to thereby obtain the pouch container 120.

Next, the effects of the pouch container 120 will be described in detail with reference to an example of the pouch container 120 in use in FIGS. 34 to 37.

The pouch container 120 is used by attaching the flexible long tube 103 to the outlet portion 17 after, for example, the opening 13 is opened using the bag-shaped portions 20A and 20B and the nutrient is filled into the filling portion 14. The pouch container 120 is carried to a destination place, such as a hospital room, with the tube 103 connected to the outlet portion 17. Therefore, the tube 103 is held using the holding portions 121, in order to prevent the tube 103 from coiling around something, being caught in something, or falling off during movement.

Figure 34:
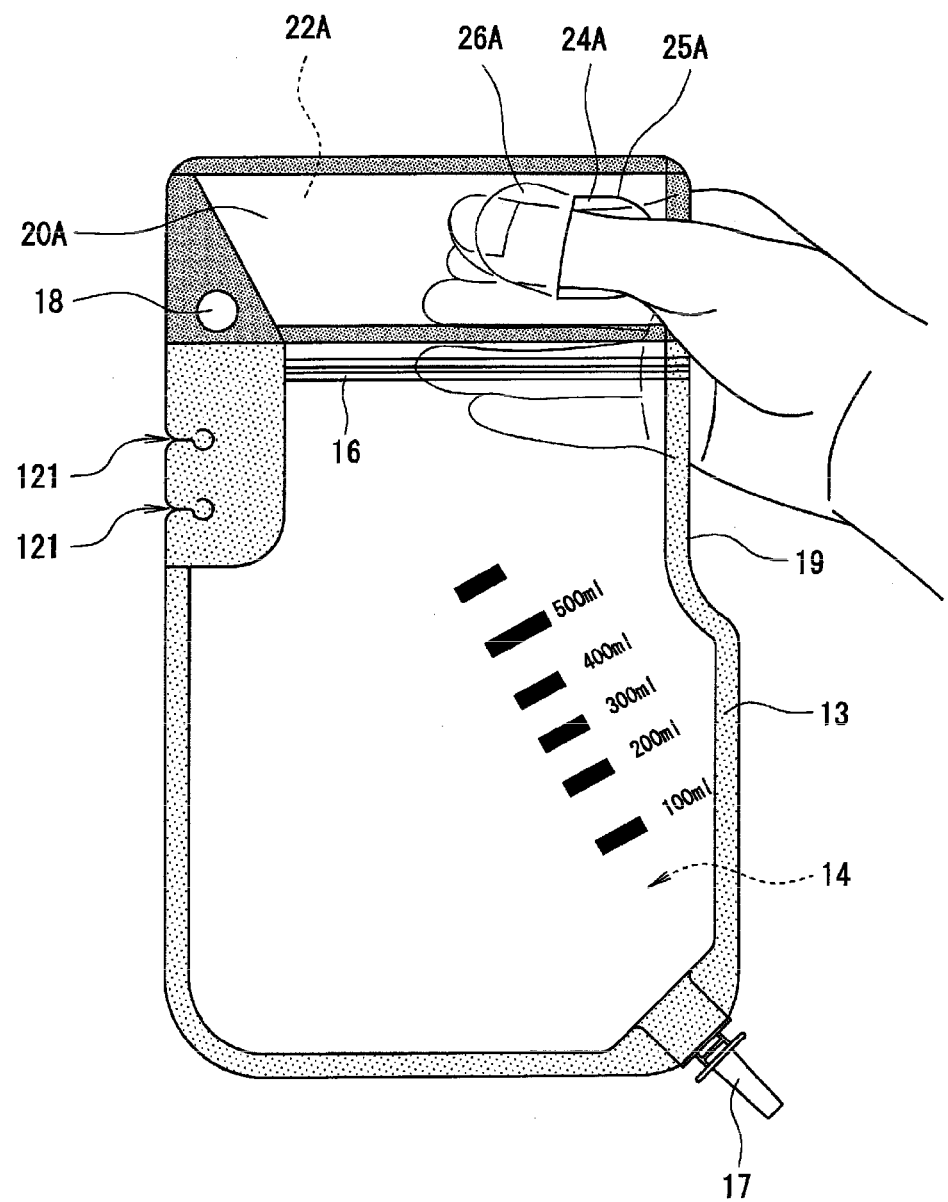
FIG. 34 shows the pouch container in use according to the eleventh embodiment of the present invention.
Figure 35:
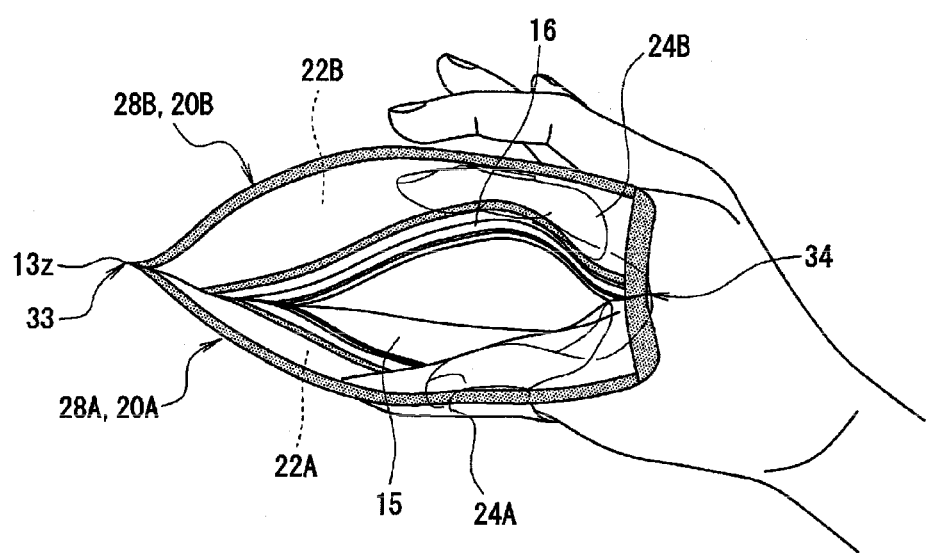
FIG. 35 shows a top view of the pouch container in use in FIG. 34.

FIGS. 34 and 35 show the opening 15 which is opened to pour the nutrient into the filling portion 14. When the nutrient is poured from the opening 15 of the pouch container into the filling portion 14, like the case of the above-described-embodiments, the thumb is inserted into the internal space of the bag-shaped portion 20A, and the index finger is inserted into the internal space 22B of the bag-shaped portion 20B, to thereby hold the container. At this time, the thumb and the index finger are inserted into the internal spaces from the side of the one lateral end portion through the insertion openings 24A and 24B, respectively. Then, by opening the space between the thumb and the index finger respectively inserted into the bag-shaped portions 20A and 20B, the zipper 16 is opened, thereby opening the opening 15. Next, the nutrient is started to be poured while the opening 15 is opened widely. Because the opening state can be maintained simply by opening the space between the thumb and the index finger, it is possible, for example, to prevent the nutrient from spilling, which could otherwise be caused when the opening 15 is closed during the pouring operation. By joining the other lateral end portions of the bag-shaped portions 20A and 20B with no gap therebetween; particularly, such that the width gradually becomes smaller moving closer to the upper end of the container (such that the shape of the seal portion becomes substantially a triangle in the front view), it is possible to prevent the nutrient from leaking from the other lateral end portions when it is poured, and enable these other end portions to function like a funnel, so that the nutrient can be poured more easily along the seal portion.

As described above, with the pouch container 120, it is possible to carry out the operation of pouring the nutrient easily while holding the container by one hand, and improve the operability of the pouring operation to a large extent. After completion of the operation of pouring the nutrient, the flexible long tube 103 is attached to the outlet portion 17 of the pouch container 120. There is provided a joint 104, for example, at one end of the tube 103, and it is fitted into the outlet portion 17.

Figure 36:
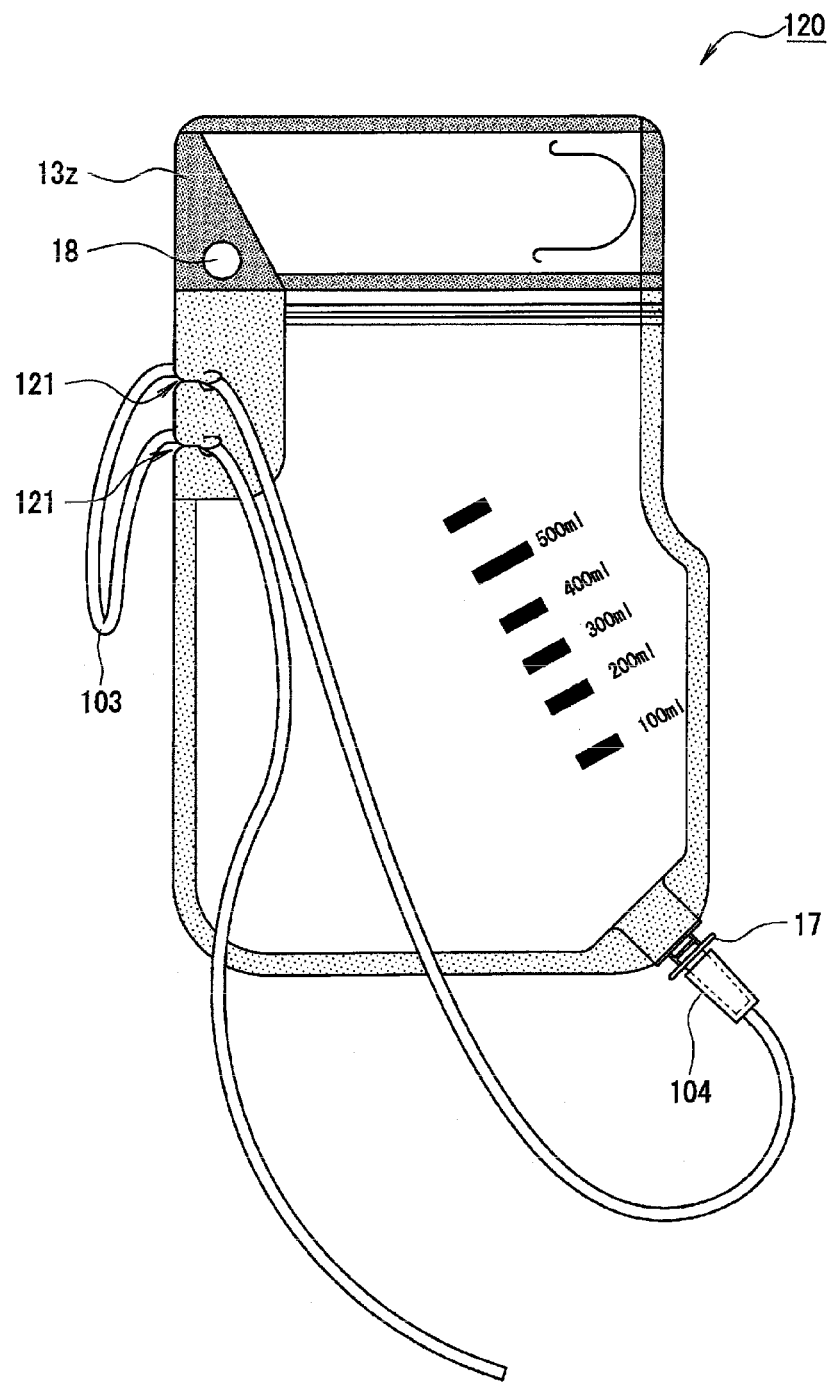
FIG. 36 shows the pouch container in use according to the eleventh embodiment of the present invention.
Figure 37:
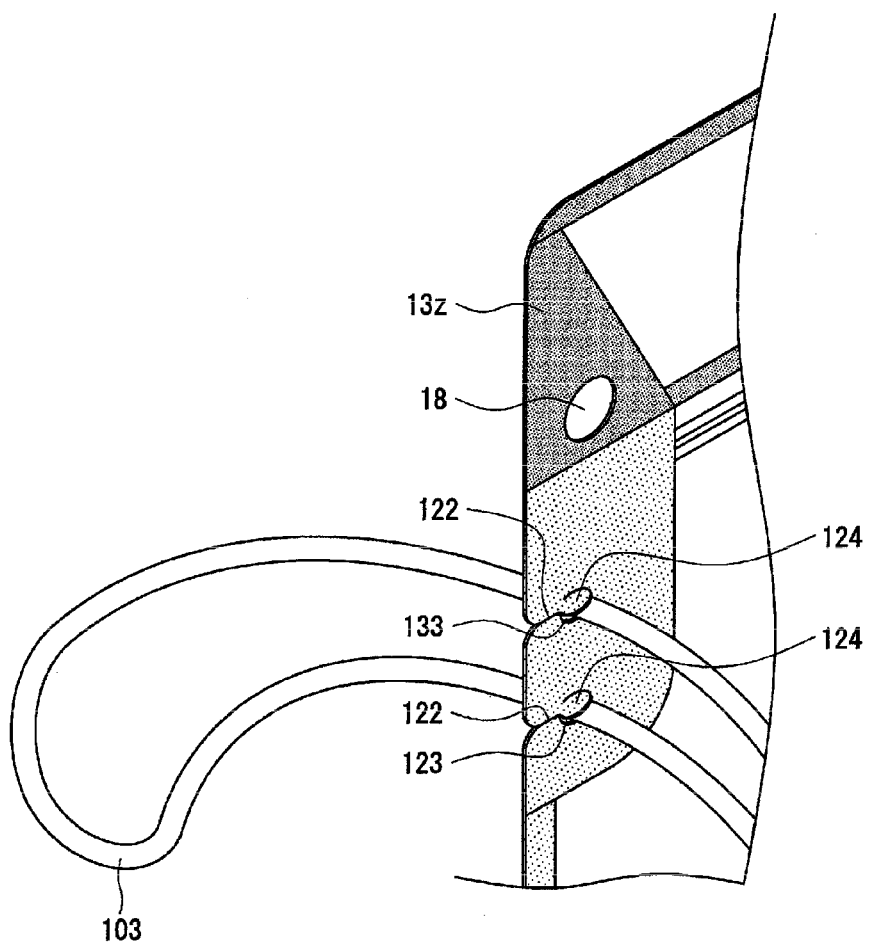
FIG. 37 shows an enlarged view of the vicinity of a tube-holding portion in FIG. 36.

FIGS. 36 and 37 show a holding state in which the tube 103 is caught in the holding portions 121. When the tube 103 is held using the holding portions 121, the tube 103 is pressed against, for example, the outer end of the widened seal portion 13z in which the holding portions 121 are formed; that is, the entrance of the introduction path 122. In doing so, the tube 103 is inserted into the housing hole 123 through the introduction path 122 and is caught in the edge portion of the housing hole 123. Because the wall surface sheet and the tube 103 are flexible, it is possible to widen the introduction path 122, and deform the tube 103 to be inserted thereinto. Therefore, the operation of holding the tube 103 can be performed by one hand without difficulty. In particular, because, in the present embodiment, the insertion openings 24A and 24B are arranged from the one lateral end side, and the holding portions 121 are arranged on the other lateral end side, it is possible, for example, to hook the tube 103 in the holding portions by the left hand immediately after the pouring operation, while holding the container by the right hand. In addition, the pouch container 120 may be suspended from the hanger, etc. Even in the suspension state, because the distance between the suspension hole 18 serving as a supporting point and the holding portion 121 is close, the holding operation is easy and can be performed by one hand.

Although the housing hole 123 is covered by the tongue piece 124 before the tube 103 is inserted, the tongue piece 124 is pushed out in one direction of the front and back directions by inserting the tube 103, thereby opening the housing hole 123. Then, the tongue piece 124, which is pushed out, presses the tube 103 from above. This improves the retention of the tube 103. By inserting the tube 103 into the two holding portions 121, the tube 103 can be held more stably.

When the tube 103 is removed from the holding portions 121, the tube 103 is pulled outward along the lateral direction. In doing so, the tube 103 is easily removed from the housing holes 123 through the introduction paths 122, and from the holding portions 121. This removal operation can also be carried out by one hand.

As described above, with the pouch container 120, the tube 103 can be hold stably using the holding portions 121 during transportation of the container or the operation of administering the nutrient. Thus, it is possible to prevent such troubles that the tube 103 is coiled around something or caught in something, or falls off. Further, because the holding portion 121 is formed by cutting in or cutting out the wall surface sheet from the outer end of the widened seal portion 13z, the operations of holding and removing the tube 103 are easy, and smooth handling of the tube 103 becomes possible.

<Twelfth Embodiment>

Figure 38:
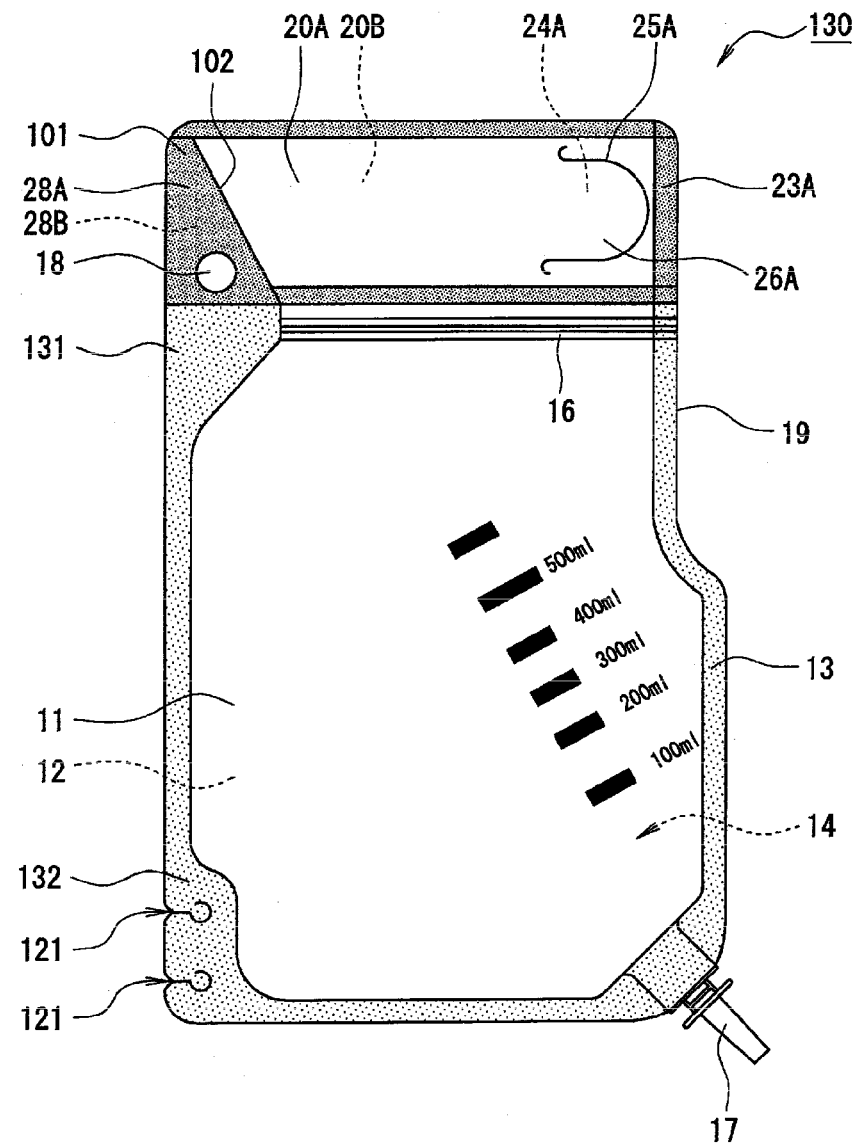
FIG. 38 shows a front view of a pouch container according to a twelfth embodiment of the present invention.

A pouch container 130 according to a twelfth embodiment will be described with reference to FIG. 38.

The pouch container 130 differs from the pouch container 120 in that the holding portions 121 are formed in a widened seal portion 132 which is different from the widened seal portion 131 in which the suspension hole 18 is formed. In the pouch container 130, in addition to the widened seal portion 131 which is formed at the same position as the widened seal portion 13z, the widened seal portion 132 in which the holding positions 121 are to be formed is provided. In the present embodiment, of the corners on the lower edge and the side edge of the container, the widened seal portion 132 (a plurality of holding portions 121) is provided on the corner opposite to the corner on which the outlet portion 17 is provided.

<Thirteenth Embodiment>

A pouch container 140 according to a thirteenth embodiment will be described with reference to FIGS. 39 to 41.

Figure 39:
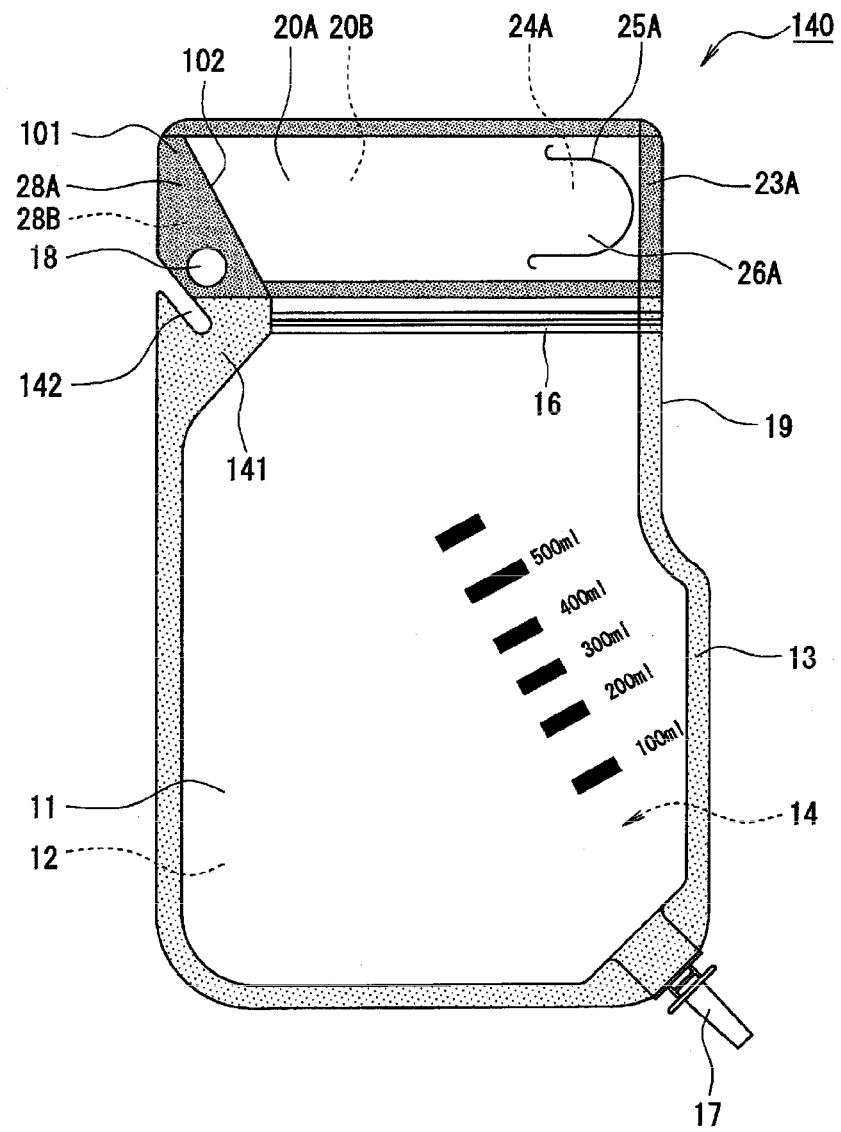
FIG. 39 shows a front view of a pouch container according to a thirteenth embodiment of the present invention.

As shown in FIG. 39, in the pouch container 140, the shape of a holding portion 142 greatly differs from that of the holding portion 121 of the pouch container 120. The pouch container 140 is similar to the pouch container 120 in that the holding portion 142 is formed in a widened seal portion 141 in which the suspension hole 18 is also formed. The holding portion 142 is formed in the widened seal portion 141 by cutting out the wall surface sheet by a width which is substantially equal to or slightly greater than the diameter d. The cutout, which forms the holding portion 142, is formed straight from the outer end of the widened seal portion 141 toward the outlet portion 17 side; that is, orthogonally downward.

Figure 40:
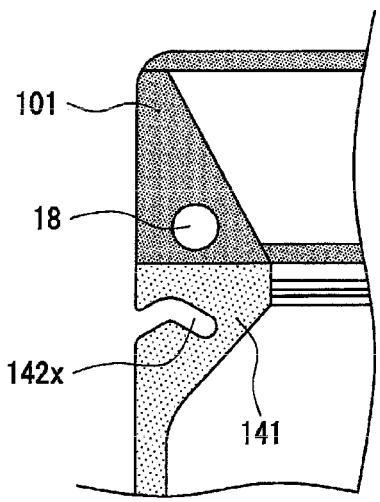
FIG. 40 shows a variant of the pouch container according to the thirteenth embodiment.
Figure 41:
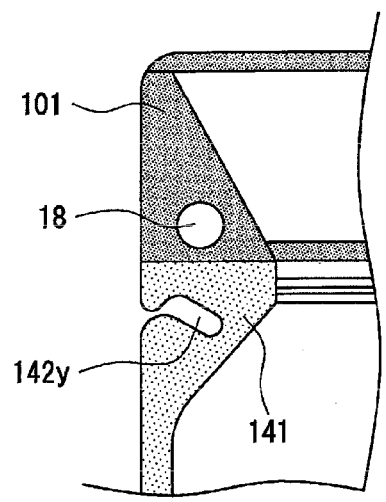
FIG. 41 shows a variant of the pouch container according to the thirteenth embodiment.

FIGS. 40 and 41 show variants of the pouch container 140. Although a holding portion 142x shown in FIG. 40 is similar to the holding portion 142 in that it is formed by cutting out the wall surface sheet by a width which is substantially equal to or slightly greater than the diameter d, it differs from the holding portion 142 in that it is bent in the middle. The cutout forming the holding portion 142x is formed such that the middle portion is gently curved and protrudes upward. The holding portion 142x also differs from the holding portion 142 in that the start point (outer end) and the end point (inner end) substantially align with each other along the lateral direction.

A holding portion 142$y$ shown in FIG. 41 differs from the holding portion 142$x$ in that the width becomes smaller on the outer side than in the bent portion. The smaller width portion preferably has a width smaller than the diameter d. Because of this, the retention of the tube 103 is improved as compared with the case of the holding portion 142$x$.

<Fourteenth Embodiment>

Figure 42:
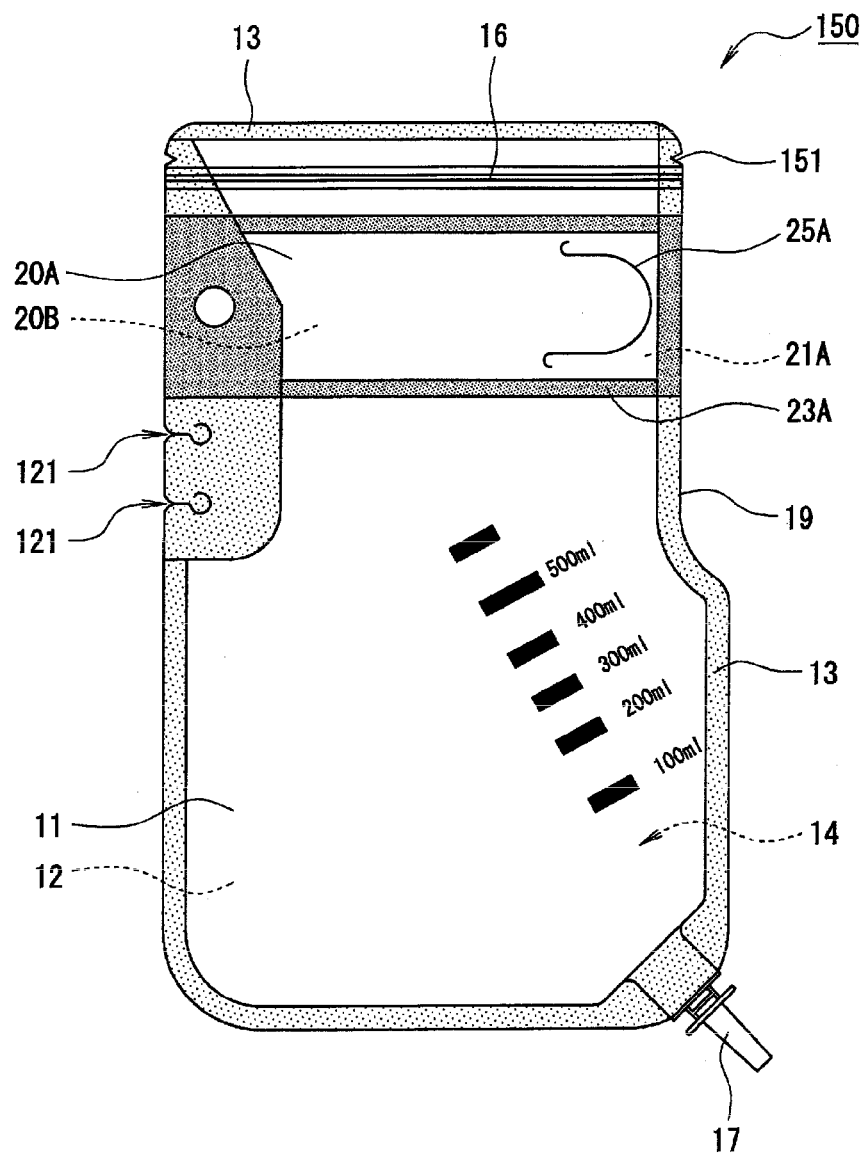
FIG. 42 shows a front view of a pouch container according to a fourteenth embodiment of the present invention.
Figure 43:
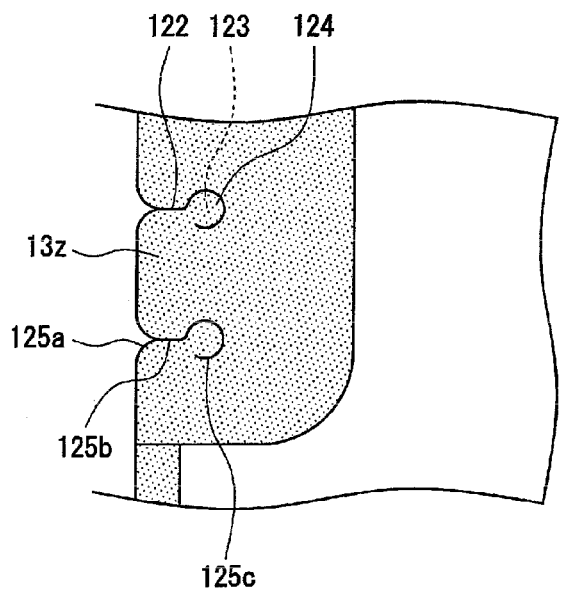
FIG. 43 shows a variant of the eleventh, twelfth, and fourteenth embodiments of the present invention.

A pouch container 150 according to a fourteenth embodiment will be described with reference to FIG. 42.

The pouch container 150 differs from the pouch container 120 in that the bag-shaped portion 20A is provided below the zipper 16 (the same applies to the bag-shaped portion 20B). The bag-shaped portion 20A is formed, for example, by joining the sheet 21A to the inner surface of the front surface sheet 11. The slit line 25A is formed in the front surface sheet 11. There is formed the edge seal portion 13 for enhancing the sealing property of the filling portion 14 in the portion of the pair of the wall surface sheets which is located above the zipper 16. Further, a notch 151 for opening the pouch container is formed between the edge seal portion 13 and the zipper 16.

Although in the eleventh, twelfth, and fourteenth embodiments the tongue piece 124 is provided so as to be connected to the upper edge of the housing hole 123 and presses the tube 103 inserted into the housing hole 123 from above, the forming pattern of the substantially c-shaped slit line 125$c$ may be changed, and the tongue piece 124 may be connected to the lower edge of the housing hole 123. In this case, because the tube 103 hangs down due to gravity, a contact area between the tube 103 inserted into the housing hole 123 and the container (tongue piece 124) can be made larger.

Figure 44:
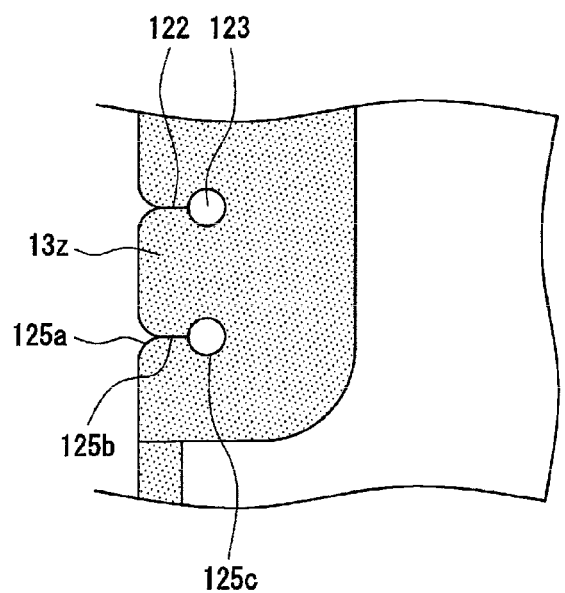
FIG. 44 shows a variant of the eleventh, twelfth, and fourteenth embodiments of the present invention.

Further, as shown in FIG. 44, the slit line 125$c$ may be formed to have a substantially circular shape; that is, the wall surface sheet may be cut out such that both ends of the slit line 125$c$ are connected to the slit line 125$b$, and the tongue piece 145 may be omitted. In this case, the housing hole 123 is always open.

The design of the above-described embodiment may be changed without departing from the object of the present invention. For example, although in the above-described embodiment the bag-shaped portion is formed by providing the bag-shaped portion-forming sheet on the inner surface of the wall surface sheet, the bag-shaped portion may be formed by providing the bag-shaped portion-forming sheet on the outer surface of the wall surface sheet. The bag-shaped portion may be formed at a position corresponding to the zipper 16 by providing the bag-shaped portion-forming sheet on the outer surface of the wall surface sheet.

Further, although in the above-described embodiment the one widthwise end portions of the pair of flap-shaped portions have been defined as the opened portion 34 in which they are separated from each other, they may be, for example, integrated before the use of the pouch container, and the portions corresponding to the opened portion may be separated upon use. In this case, it is preferable to make the strength of the formed portion of the opened portion 34 less than the adherence strength of the closed portion 33 by, for example, providing a perforated easy-cut portion or providing a smaller adhesion width in the portion corresponding to the opened portion. By applying the opening operation force by the fingers inserted into the bag-shaped portions to those portions, the portions corresponding to the opened portion become separated.

The shape of the suspension hole through which the hanger hook or the like is inserted is not limited to a circle. For example, by adopting a triangle shape or the like, the orientation of the pouch container can be adjusted when it is hung from the stand, etc.

The shape of the pouch container is also not limited to the substantially rectangular shape. For example, there may be adopted a variety of shapes such as a circle, an ellipse, an oval (an egg shape), a triangle (preferably, an inverted triangle), and a polygon in plane view.

REFERENCE SIGNS LIST

10 POUCH CONTAINER, 11 FRONT SURFACE SHEET, 12 BACK SURFACE SHEET, 13, 23A, 23B EDGE SEAL PORTION, 14 FILLING PORTION, 15 OPENING, 16 ZIPPER, 17 OUTLET PORTION, 18 SUSPENSION HOLE, 19 CUT PORTION, 20A, 20B BAG-SHAPED PORTION, 21A, 21B BAG-SHAPED PORTION-FORMING SHEET, 22A AND 22B INTERNAL SPACE, 24A AND 24B INSERTION OPENING, 25A, 25B SLIT LINE, 26A, 26B TONGUE PIECE, 27 PLEAT LINE, 28A, 28B FLAP-SHAPED PORTION.

The invention claimed is:

1. A pouch container comprising:
   at least a pair of wall surface sheets, one of the wall surface sheets constituting a front surface portion and the other of the wall surface sheets constituting a back surface portion;
   a filling portion being surrounded by the wall surface sheets; and
   an opening formed between the front surface portion and the back surface portion on a first side of the pouch container in a longitudinal direction, the opening being connected to the filling portion;
   a pair of bag-shaped portions, one of the bag-shaped portions being provided in the front surface portion and the other of the bag-shaped portions being provided in the back surface portion;
   a zipper configured to close the opening;
   flap-shaped portions extending upwards from the zipper to the first side of the pouch container in the longitudinal direction;
   a seal portion configured to join together portions of the flap-shaped portions, the portions of the flap-shaped portions being disposed on a side closer to the first side of the pouch container in a lateral direction, the seal portion being provided between the portions of the flap-shaped portions, wherein:
   the bag-shaped portions are disposed in the flap-shaped portions, and
   at least one of the pair of bag-shaped portions is formed by joining a periphery of an inner sheet inserted between the wall surface sheets to an inner surface of a corresponding one of the wall-surface sheets, the at least one bag-shaped portion includes: (i) an internal space separated from the filling portion, and (ii) an insertion opening formed on a corresponding one of the wall surface sheets to enable insertion of a finger into the internal space from one side of the pouch container in the lateral direction.

2. The pouch container according to claim 1, wherein:
   the insertion opening is provided in the at least one bag-shaped portion on a side closer to the second side of the pouch container in the lateral direction.

3. The pouch container according to claim 2, wherein:
the seal portion is formed so as to be inclined in the longitudinal direction and the lateral direction so that an aperture of the flap-shaped portions gradually becomes smaller toward the zipper.

4. The pouch container according to claim 3, wherein:
the at least one bag-shaped portion has a tongue piece for closing the insertion opening; and
the insertion opening is opened by folding the tongue piece into the internal space.

5. The pouch container according to claim 4, further comprising:
an outlet portion provided on the other end side in the longitudinal direction, a flexible long tube being attached to the outlet portion; and
an edge seal portion formed by joining edges of the front surface portion and the back surface portion to each other, wherein:
a tube-holding portion is formed in the edge seal portion, for holding the tube; and
the tube-holding portion is formed by cutting in or cutting out the wall surface sheets from an outer end of the edge seal portion by a length equal to or greater than the diameter of the tube.

6. The pouch container according to claim 5, wherein the tube holding portion comprises:
an introduction path which has a width smaller than the diameter of the tube; and
a housing hole which is connected to the introduction path and is equal in size with or larger than the tube.

7. The pouch container according to claim 6, wherein the tube-holding portion has a tongue piece which covers at least a portion of the housing hole and contacts the tube when the tube is inserted into the housing hole.

8. The pouch container according to claim 7, wherein:
the edge seal portion has widened seal portions which are formed by widening the width of the edge seal portion locally; and
a suspension hole and the tube-holding portion are formed in one of the widened seal portions.

9. The pouch container according to claim 5, wherein the tube-holding portion has a tongue piece which covers at least a portion of a housing hole and contacts the tube when the tube is inserted into the housing hole.

10. The pouch container according to claim 9, wherein:
the edge seal portion has widened seal portions which are formed by widening the width of the edge seal portion locally; and
a suspension hole and the tube-holding portion are formed in one of the widened seal portions.

11. The pouch container according to claim 5, wherein:
the edge seal portion has widened seal portions which are formed by widening the width of the edge seal portion locally; and
a suspension hole and the tube-holding portion are formed in one of the widened seal portions.

12. The pouch container according to claim 2, wherein:
the at least one bag-shaped portion includes a tongue piece for closing the insertion opening; and
the insertion opening is opened by folding the tongue piece into the internal space.

13. The pouch container according to claim 12, further comprising:
an outlet portion provided on the other end side in the longitudinal direction, a flexible long tube being attached to the outlet portion; and
an edge seal portion formed by joining edges of the front surface portion and the back surface portion to each other, wherein:
a tube-holding portion is formed in the edge seal portion, for holding the tube; and
the tube-holding portion is formed by cutting in or cutting out the wall surface sheets from an outer end of the edge seal portion by a length equal to or greater than the diameter of the tube.

14. The pouch container according to claim 13, wherein:
the edge seal portion has widened seal portions which are formed by widening the width of the edge seal portion locally; and
a suspension hole and the tube-holding portion are formed in one of the widened seal portions.

15. The pouch container according to claim 1, wherein:
the at least one bag-shaped portion has a tongue piece for closing the insertion opening; and
the insertion opening is opened by folding the tongue piece into the internal space.

16. The pouch container according to claim 15, further comprising:
an outlet portion provided on the other end side in the longitudinal direction, a flexible long tube being attached to the outlet portion; and
an edge seal portion formed by joining edges of the front surface portion and the back surface portion to each other, wherein:
a tube-holding portion is formed in the edge seal portion, for holding the tube; and
the tube-holding portion is formed by cutting in or cutting out the wall surface sheets from an outer end of the edge seal portion by a length equal to or greater than the diameter of the tube.

17. The pouch container according to claim 16, wherein:
the edge seal portion has widened seal portions which are formed by widening the width of the edge seal portion locally; and
a suspension hole and the tube-holding portion are formed in one of the widened seal portions.

18. The pouch container according to claim 1, further comprising:
an outlet portion provided on the other end side in the longitudinal direction, a flexible long tube being attached to the outlet portion; and
an edge seal portion formed by joining edges of the front surface portion and the back surface portion to each other, wherein:
a tube-holding portion is formed in the edge seal portion, for holding the tube; and
the tube-holding portion is formed by cutting in or cutting out the wall surface sheets from an outer end of the edge seal portion by a length equal to or greater than the diameter of the tube.

19. The pouch container according to claim 18, wherein:
the edge seal portion has widened seal portions which are formed by widening the width of the edge seal portion locally; and
a suspension hole and the tube-holding portion are formed in one of the widened seal portions.

20. The pouch container according to claim 1, wherein:
the at least one bag-shaped portion has a tongue piece for closing the insertion opening; and
the insertion opening is opened by folding the tongue piece into the internal space.

21. The pouch container according to claim 20, further comprising:

an outlet portion provided on the other end side in the longitudinal direction, a flexible long tube being attached to the outlet portion; and an edge seal portion formed by joining edges of the front surface portion and the back surface portion to each other, wherein:

a tube-holding portion is formed in the edge seal portion, for holding the tube; and the tube-holding portion is formed by cutting in or cutting out the wall surface sheets from an outer end of the edge seal portion by a length equal to or greater than the diameter of the tube.

22. The pouch container according to claim 21, wherein:

the edge seal portion has widened seal portions which are formed by widening the width of the edge seal portion locally; and a suspension hole and the tube-holding portion are formed in one of the widened seal portions.

23. The pouch container according to claim 1, further comprising:

an outlet portion provided on the other end side in the longitudinal direction, a flexible long tube being attached to the outlet portion; and an edge seal portion formed by joining edges of the front surface portion and the back surface portion to each other, wherein:

a tube-holding portion is formed in the edge seal portion, for holding the tube; and the tube-holding portion is formed by cutting in or cutting out the wall surface sheets from an outer end of the edge seal portion by a length equal to or greater than the diameter of the tube.

24. The pouch container according to claim 23, wherein:

the edge seal portion has widened seal portions which are formed by widening the width of the edge seal portion locally; and a suspension hole and the tube-holding portion are formed in one of the widened seal portions.

25. The pouch container according to claim 1, wherein the inner sheet forming the at least one bag-shaped portion is provided across entire lengths of the wall surface sheets in the lateral direction.

26. A pouch container comprising:

at least a pair of wall surface sheets, one of the wall surface sheets constituting a front surface portion and the other of the wall surface sheets constituting a back surface portion;

a filling portion surrounded by the wall surface sheets; and an opening formed between the front surface portion and the back surface portion on a first side of the pouch container in a longitudinal direction, the opening being connected to the filling portion;

a pair of bag-shaped portions, one of the bag-shaped portions being provided in the front surface portion and the other of the bag-shaped portions being provided in the back surface portion;

a zipper configured to close the opening:

flap-shaped portions extending upwards from the zipper to the first side of the pouch container in the longitudinal direction:

a seal portion configured to join together portions of the flap-shaped portions, the portions of the flap-shaped portions being disposed on a side closer to the first side of the pouch container in a lateral direction, the seal portion being provided between the portions of the flap-shaped portions, wherein:

the bag-shaped portions are disposed in the flap-shaped portions, and at least one of the pair of bag-shaped portions is formed by inwardly folding upper portions of the wall surface sheets and joining together inner surfaces of the wall surface sheets, the at least one bag-shaped portion includes: (i) an internal space separated from the filling portion, and (ii) an insertion opening formed on a corresponding one of the wall surface sheets to enable insertion of a finger into the internal space from one side of the pouch container in the lateral direction.

\* \* \* \* \*